United States Patent
Leonida

(10) Patent No.: US 7,807,305 B2
(45) Date of Patent: Oct. 5, 2010

(54) FUEL CELL SYSTEM SUITABLE FOR COMPLEX FUELS AND A METHOD OF OPERATION OF THE SAME

(76) Inventor: Andrei Leonida, 35 Timberwood Rd., West Hartford, CT (US) 06117

( * ) Notice: Subject to any disclaimer, the term of this patent is extended or adjusted under 35 U.S.C. 154(b) by 997 days.

(21) Appl. No.: 11/588,200

(22) Filed: Oct. 26, 2006

(65) Prior Publication Data

US 2007/0099062 A1    May 3, 2007

Related U.S. Application Data

(60) Provisional application No. 60/731,054, filed on Oct. 28, 2005.

(51) Int. Cl.
*H01M 8/02* (2006.01)
*H01M 8/18* (2006.01)
*H01M 4/86* (2006.01)
*H01M 8/06* (2006.01)

(52) U.S. Cl. .................. 429/418; 429/405; 429/416; 429/422

(58) Field of Classification Search .................. 429/38
See application file for complete search history.

(56) References Cited

U.S. PATENT DOCUMENTS

| | | | |
|---|---|---|---|
| 3,172,784 A | | 3/1965 | Blackmer |
| 3,492,163 A | | 1/1970 | Himer |
| 3,682,704 A | * | 8/1972 | Keefer .................. 429/19 |
| 3,765,946 A | | 10/1973 | Werner, et al. |
| 3,814,631 A | | 6/1974 | Warszawski, et al |
| 4,294,891 A | | 10/1981 | Yao et al. |
| 4,331,284 A | | 5/1982 | Schulz et al. |

(Continued)

FOREIGN PATENT DOCUMENTS

GB    1 146 900    3/1969

(Continued)

OTHER PUBLICATIONS

Shi-Gang Sun, Studying Electrocatalysis Oxidation of Small Organic Molecules with In-Situ Infrared Spectroscopy, 1998, pp. 243-255, New York.

(Continued)

*Primary Examiner*—Dah-Wei D Yuan
*Assistant Examiner*—Amanda Barrow
(74) *Attorney, Agent, or Firm*—Michaud-Kinney Group LLP

(57) ABSTRACT

A fuel cell system comprising a first electrode-electrolyte assembly having a first electrode coupled to one side of thereof and a second electrode coupled to a generally opposite side of the first electrode-electrolyte assembly, and a first conduit for delivering fuel to the first electrode at ambient temperature. The fuel cell system includes a second electrode-electrolyte assembly having a third electrode coupled thereto assembly, and a fourth electrode coupled to a generally opposite side of the second electrode-electrolyte assembly; and a mesh positioned between and in sealing engagement with the second electrode and the third electrode. A second conduit is in fluid communication with the fourth electrode for delivering oxidant thereto. The fuel cell system further includes means for providing an electrical potential across the first electrode-electrolyte assembly and an electrical load circuit for using an energy output generated across the second electrode-electrolyte assembly.

9 Claims, 15 Drawing Sheets

U.S. PATENT DOCUMENTS

| | | | |
|---|---|---|---|
| 4,397,917 | A | 8/1983 | Chi et al. |
| 4,938,850 | A | 7/1990 | Rothschild et al. |
| 5,072,917 | A | 12/1991 | Pleva |
| 5,102,499 | A | 4/1992 | Jodgens et al. |
| 5,108,849 | A | 4/1992 | Watkins et al. |
| 5,201,997 | A | 4/1993 | Fishter et al. |
| 5,227,256 | A | 7/1993 | Marianowski et al. |
| 5,296,109 | A | 3/1994 | Carlson et al. |
| 5,316,644 | A | 5/1994 | Titterington et al. |
| 5,324,565 | A | 6/1994 | Leonida et al. |
| 5,366,823 | A | 11/1994 | Leonida et al. |
| 5,372,689 | A | 12/1994 | Carlson et al. |
| 5,464,524 | A | 11/1995 | Ogiwara et al. |
| 5,466,354 | A | 11/1995 | Leonida et al. |
| 5,565,071 | A | 10/1996 | Demaray et al. |
| 5,770,327 | A | 6/1998 | Barnett et al. |
| 5,846,669 | A | 12/1998 | Smotkin et al. |
| 5,856,036 | A | 1/1999 | Smotkin et al. |
| 5,942,350 | A | 8/1999 | Roy et al. |
| 6,037,075 | A | 3/2000 | Critz et al. |
| 6,171,719 | B1 | 1/2001 | Roy et al. |
| 6,284,402 | B1 | 9/2001 | Mallouk et al. |
| 6,375,812 | B1 | 4/2002 | Leonida |
| 6,464,846 | B1 | 10/2002 | Titterington |
| 6,479,178 | B2 | 11/2002 | Barnett |
| 6,500,319 | B2 | 12/2002 | LaConti et al. |
| 6,585,869 | B2 | 7/2003 | Shiepe et al. |
| 6,589,681 | B1 | 7/2003 | Yamanis |
| 6,660,419 | B1 | 12/2003 | Nishida et al. |
| 6,811,905 | B1 | 11/2004 | Cropley et al. |
| 6,905,794 | B2 | 6/2005 | Kashino et al. |
| 6,913,791 | B2 | 7/2005 | Burca et al. |
| 6,932,897 | B2 | 8/2005 | Burca et al. |
| 6,960,403 | B2 | 11/2005 | Morse et al. |
| 2002/0192537 | A1 | 12/2002 | Ren |
| 2003/0062270 | A1* | 4/2003 | McAlister .................. 205/697 |
| 2004/0224214 | A1 | 11/2004 | Vamos et al. |
| 2005/0095491 | A1 | 5/2005 | Tarver et al. |
| 2005/0153198 | A1* | 7/2005 | Suzuki et al. ............... 429/128 |
| 2005/0172482 | A1 | 8/2005 | Morishima et al. |
| 2005/0196660 | A1 | 9/2005 | Tsushima |
| 2005/0196666 | A1 | 9/2005 | Gottesfeld et al. |
| 2005/0202306 | A1 | 9/2005 | Zhang |
| 2005/0238933 | A1 | 10/2005 | Kim et al. |
| 2005/0238943 | A1 | 10/2005 | Akiyama et al. |
| 2005/0244685 | A1 | 11/2005 | Kim et al. |
| 2005/0244703 | A1 | 11/2005 | Osenar et al. |

FOREIGN PATENT DOCUMENTS

| | | | |
|---|---|---|---|
| GB | 1146900 | * | 3/1969 |
| JP | 06-325782 | * | 10/1993 |
| JP | 06-325782 | * | 11/1994 |
| JP | 06 325782 A | | 11/1994 |
| JP | 07-078627 | * | 3/1995 |
| JP | 07 078627 A | | 3/1995 |
| WO | WO 2005/096419 A | | 10/2005 |

OTHER PUBLICATIONS

C. Pu, et al., A Methanol Impermeable Proton Conducting Composite Electrolyte System, J. Electrochem. Soc., vol. 142, No. 7, 1995, pp. L119-L120, New Jersey.

J.H. Shim,et al.,Electrochemical Acceleration of Hydrogen Transfer Through a Methanol . . . , J. Electrochem. Soc., vol. 150, No. 12, 2003, pp. A1583-A1588, New Jersey.

J.T. Muller, et al., Electro-oxidation of Dimethyl Ether in a Polymer Electrolyte Membrane Fuel Cell, J: Electrochem. Soc., vol. 147, No. 11, 2000, pp. 4058-4060, New Jersey.

S.P. Balomenou, et al., Triode Fuel Cells and Batteries, Journal of the Electrochemical Society; vol. 151, No. 11, 2004, A1874-A1877, New Jersey.

J. O'M. Bockris, et al., Chapter Three, Thermodynamic Aspects of Electrochemical Energy Conversion, McGraw-Hill Book, 1969, pp. 145-161, New Jersey.

J. O'M. Bockris, et al., Chapter Ten, Types of Fuel Cells, McGraw-Hill Book, 1969, pp. 514-575, New Jersey.

B. J. Nakamura, et al., Making Hydrogen by Electrolysis of Methanol, NASA Tech Brief, vol. 26, No. 6, Jun. 2002, New York.

C. Apblet, et al., Effect of Forced Air vs. Passive Cathode on the Performance and Lifetime of a Direct . . . ,207th Meeting of the Electrochemical Society, May 2005, New Jersey.

A. Leonida, Hydrogen-Oxygen Electrochemical Devices for Zero-G Applications, European Space Power Conference, Madrid, Spain, Oct. 1989, pp. 227-231, Spain.

T.D. Jarvi, et al., Fundamental Apects of Vacuum and Electrocatalytic Reactions of Methanol and Formic Acid on Platinum Surfaces, Electrocatalysis, 1998, pp. 75-113, New York.

T.R. Ralph, et al., Catalysis for Low Temperature Fuel Cells; Part I: The Cathode Challenges, Platinum Metals Review, vol. 46, No. 1, 2002, pp. 3-14, United Kingdom.

T.R. Ralph, et al., Catalysis for Low Temperature Fuel Cells; Part II: The Anode Challenges, Platinum Metals Review, vol. 46, No. 3,2002, pp. 117-135, United Kingdom.

C. Apblett, et al.,Electrical Power From Biologically Harvestable Fuels:An Overview of Sandia National Laboratories Grand Challenge . . . May 2006, Abstract 579, United Kingdom.

C.L. Green, et al., Surface Area Determination of Unsupported High Surface Area Pt-Ru Electrocatalyst by . . . , Electrochemical Soc. Proceeding vol. 2001-4, pp. 61-71, New Jersey.

International Search Report dated Jun. 4, 2007, for PCT/US2006/042308.

* cited by examiner

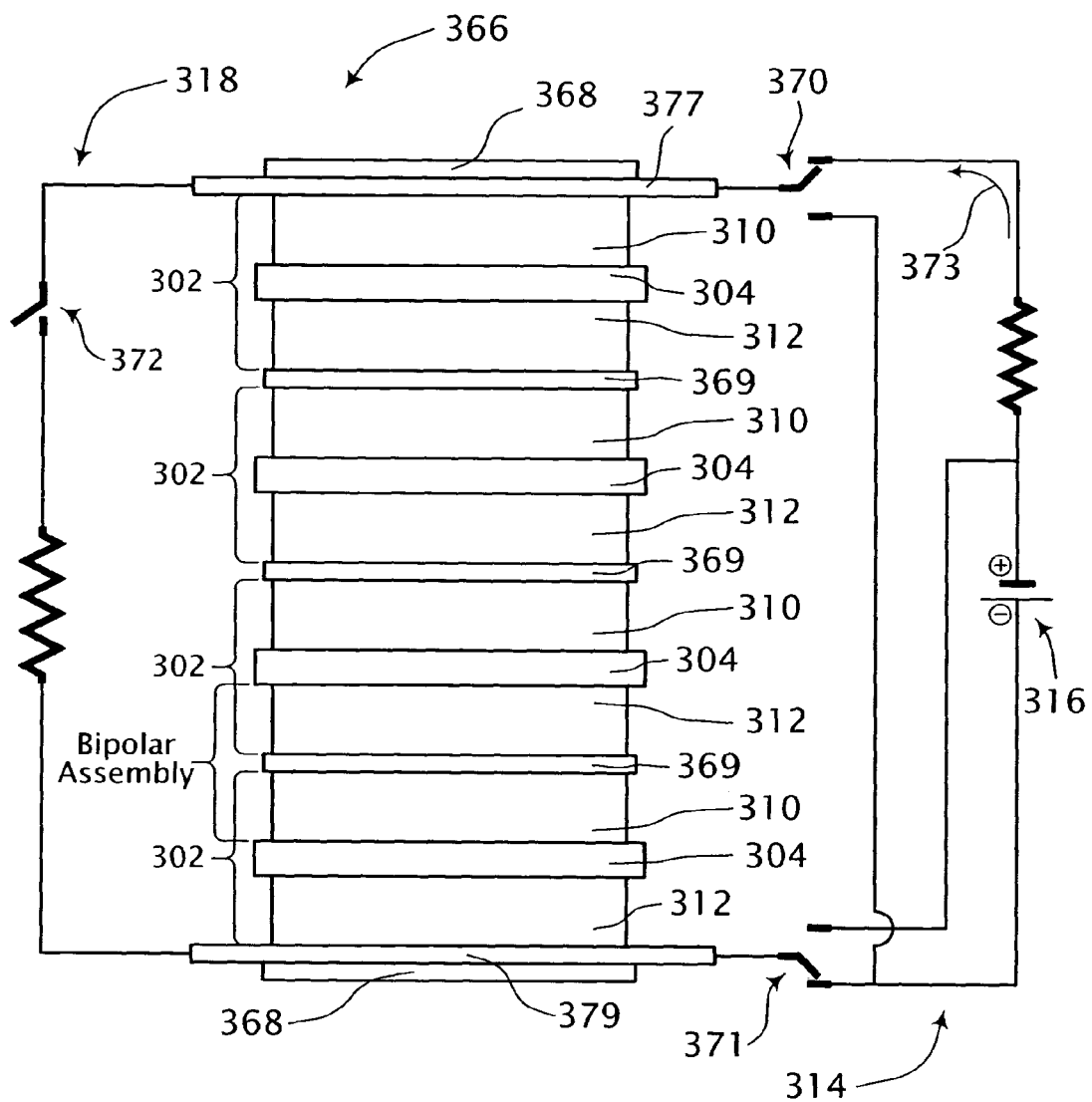

FUEL CELL SYSTEM SUITABLE FOR COMPLEX FUELS AND A METHOD OF OPERATION OF THE SAME

This application claims priority from provisional application Ser. No. 60/731,054, filed Oct. 28, 2005, the disclosure of which is incorporated by reference herein in its entirety.

FIELD OF THE INVENTION

The present invention is generally directed to a fuel cell and fuel processing system and a method of operating the same; and is more specifically directed to ambient temperature processing of organic fuels internal to the fuel cell system by electrochemical means.

BACKGROUND OF THE INVENTION

Fuel cells are comprised of electrochemical cells used for providing an environmentally clean method for generating electricity. What makes fuel cells different from another electrochemical energy converter, such as a battery, is the fact that both fuel and oxidant are continuously supplied to their respective electrodes, and reaction products are continuously removed from the fuel cell. Electric current will continue to flow essentially as long as fuel and oxidant are supplied to the electrodes. Fuel cell systems can be formed by stacking and electrically connecting many electrochemical cells together to provide power generation for residential, commercial and industrial scale power applications. Individual fuel cells in fuel cell systems each include at least two catalytic electrodes in contact with an electrolyte medium comprising an electrode-electrolyte assembly. The individual fuel cells also include devices for managing fuel and oxidant flows thereto and for controlling temperature within operating limits. Use of pure hydrogen as a fuel results in higher fuel cell energy density outputs compared to other fuels. However, hydrogen has a number of drawbacks including: flammability; storage difficulties; and comparatively high production costs.

In addition to hydrogen, naturally occurring organic fuels and synthetic fuels can be used in fuel cells. Naturally occurring fuels are preferred over synthetic fuels because of their abundance and lower cost compared to cost prohibitive synthetic fuels. Naturally occurring organic fuels as well as synthetic fuels can form hydrogen external to the fuel cell system using an endothermic chemical reaction such as steam reforming. However, steam reforming is a slow responding process because it relies on thermal energy input to accommodate load changes. As such, steam reforming is limited mostly to steady state fuel cell operations at temperatures much higher than ambient temperature. The steady state operating limitation makes such fuel cells impractical for varying power output to follow transient electric load demands. Moreover, operation of fuel cells at such high temperatures precludes the use of most polymer electrolyte membranes. Various fuel cell designs have utilized steam reformers external to the fuel to allow for fuel cell operation at ambient temperatures. However, steam reforming outside a fuel cell increases cost and does not provide improved transient load following capability. Hydrogen generated by steam reformers external to the fuel cell could be accumulated in a storage facility. However, storage of highly flammable fuels such as hydrogen is dangerous. Moreover hydrogen storage facilities generally limit fuel cells to stationary applications.

Modifications of fuel cell electrodes to utilize hydrogen from naturally occurring organic matter include use of ruthenium in the catalyst on the electrodes, which can lower operating temperature requirements below the boiling point of water. However, fuel cells comprising ruthenium containing catalytic electrodes are typically operated above ambient temperature.

Hydrogen can be obtained at ambient temperature (i.e., without steam reforming) from simple forms of water-soluble organic fuels such as methanol. However, use of methanol is generally not cost-effective enough for widespread application. Use of complex organic fuels, such as hexose, is desirable for use in fuel cells because of their natural abundance and competitive cost. When used in fuel cells, complex organic fuels such as hexose react to release hydrogen in a sequence of electrochemical de-hydrogenation reactions. Typically, intermediates are produced as a result of such de-hydrogenation reactions. These intermediates are further reacted to waste products. Some of these intermediates, however, are known to poison and deactivate the fuel side of catalytic electrodes, essentially stopping the production of hydrogen. Certain fuels such as methanol are less likely to cause fuel side catalytic electrode poisoning if operated at elevated temperatures. However, methanol has a high permeability through electrolyte membranes and can diffuse through the membrane thereby polarizing the oxidant side of the catalytic electrode. Such polarization reduces the performance of the fuel cell.

Hydrogen permeable metal barriers have been used to limit the diffusion of methanol across electrolyte membranes. However, use of metal barriers also limits the transport of electrochemically active species such as hydrogen ions and neutral atoms and thus, limits the performance achievable directly from methanol fuel. The approach where the access of methanol to the electrode is controlled by means of other permeable membranes, such as polymers, has the disadvantage of requiring elevated temperature for proper operation and to exceed the performance levels of fuel cells having metal barriers.

The performance of fuel cells using catalytic electrodes can degrade due to catalyst deactivation and poisoning by reaction intermediates, especially near ambient operating temperature. For catalytic electrodes comprising platinum, carbon monoxide is a likely poisoning intermediate. Elevation of the operating temperature of the fuel cell to about 200° C. can eliminate such poisoning. While elevating the operating temperature of the fuel cell may be practical in fuel cell applications operating continuously at or near steady state, it is difficult to implement for applications that use the fuel cell on a transient or as-needed basis and makes the use of polymer electrolyte assemblies impractical.

There is a need to provide a fuel cell system including a fuel processing device/system capable of processing complex fuels internal to the fuel cell at near ambient temperature. Prior art methods and systems for addressing these needs for portable or transient applications were either too expensive, inefficient, or ineffective or a combination of all of these. Based on the foregoing, it is the general object of the present invention to improve upon or overcome the problems and drawbacks of the prior art.

SUMMARY OF THE INVENTION

According to one aspect of the present invention, a fuel cell system capable of processing organic fuels at ambient temperature and generating an electrical energy output is provided. The fuel cell system comprises two electrode-electrolyte assemblies each having a catalytic electrode coupled to opposing sides thereof and an electrically conductive mesh disposed in sealing engagement therebetween. A first conduit delivers a fuel at ambient temperature to one side of one of the electrode-electrolyte assemblies. The electrically conductive mesh has a plurality of apertures extending therethrough, such that portions of catalytic electrodes, adjacent to the mesh, extend through the apertures and engage each other. A second conduit delivers an oxidant to one side of another of the electrode-electrolyte assemblies. The fuel cell system includes means for providing an electrical potential across one of the electrode-electrolyte assemblies and an electrical load circuit for using the energy output generated across the other electrode-electrolyte assembly.

In another aspect of the present invention, the means for providing the electrical potential has a positive terminal in electrically conductive communication with one side of one of the electrode-electrolyte assemblies and a negative terminal in electrically conductive communication with the opposing side of the same electrode-electrolyte assembly for providing process energy for a hydrogen formation reaction and removing poisons from the catalytic electrode, and for causing hydrogen to diffuse through the electrode-electrolyte assembly to the other electrode-electrolyte assembly.

In another aspect of the present invention, a fuel cell system operable with one electrode-electrolyte assembly for processing organic fuels at ambient temperature and generating an electrical energy output is provided. The fuel cell system comprises an electrode-electrolyte assembly having a first catalytic electrode coupled to one side of the electrode-electrolyte assembly, and a second catalytic electrode coupled to a generally opposite side of the electrode-electrolyte assembly. A first conduit delivers fuel to the first catalytic electrode at ambient temperature and a second conduit delivers an oxidant to the second catalytic electrode. The fuel cell system includes means for providing an electrical potential across the first catalytic electrode, the electrode-electrolyte assembly and the second catalytic electrode. In addition, an electrical load circuit is included for using an energy output generated across the first catalytic electrode, the electrode-electrolyte assembly and the second catalytic electrode.

In yet another aspect of the present invention, the means for providing the electrical potential has a positive terminal in electrically conductive communication with the first catalytic electrode and a negative terminal in electrically conductive communication with the second catalytic electrode for providing process energy for a hydrogen formation reaction and removing poisons from the first catalytic electrode, and for causing hydrogen to diffuse through the electrode-electrolyte assembly to the second catalytic electrode. The fuel cell system also includes a first electrical circuit comprising the means for providing the electrical potential. The first electrical circuit and the electrical load circuit are interlocked such that during operation the first electrical circuit is closed when the electrical load circuit is open and the electrical load circuit is closed when the first electrical circuit is open. During operation, the first electrical circuit and the electrical load circuit are opened and closed for predetermined periods of time.

Another aspect of the present invention involves a method of operation of the fuel cell system wherein fuel and oxidant are delivered to the electrode-electrolyte assemblies by respective conduits. Process energy for an ambient temperature electrochemical reaction to form hydrogen and remove poisons from one of the catalytic electrodes is provided by establishing electrically conductive communication between a positive terminal of the means for providing the electrical potential and one of the catalytic electrodes; and establishing electrically conductive communication between a negative terminal of the means for providing the electrical potential and another catalytic electrode. Hydrogen is diffused through one of the electrode-electrolyte assemblies for use in generating an energy output across the other electrode-electrolyte assembly.

In yet another aspect of the present invention wherein a fuel cell system is operated with one electrode-electrolyte membrane the method of operation includes providing a first electrical circuit comprising means for providing an electrical potential. The first electrical circuit is interlocked with an electrical load circuit such that during operation the first electrical circuit is closed when the electrical load circuit is open and the electrical load circuit is closed when the first electrical circuit is open. The first electrical circuit and the electrical load circuit are cyclically opened and closed for predetermined periods of time for alternating between fuel processing and power generation cycles.

Another embodiment of the present invention involves a method of selecting a preferred fuel for a fuel cell system comprising the steps of selecting the fuel capable of being dissolved in water; and selecting an aqueous solution of the fuel, wherein the Gibbs free energy of the fuel is preferably greater than the beat of reaction of the fuel.

DESCRIPTION OF THE DRAWINGS

FIG. 19 is a schematic drawing of a plurality of fuel cells of FIG. 14.

DETAILED DESCRIPTION OF THE PREFERRED EMBODIMENT

Figure 1:
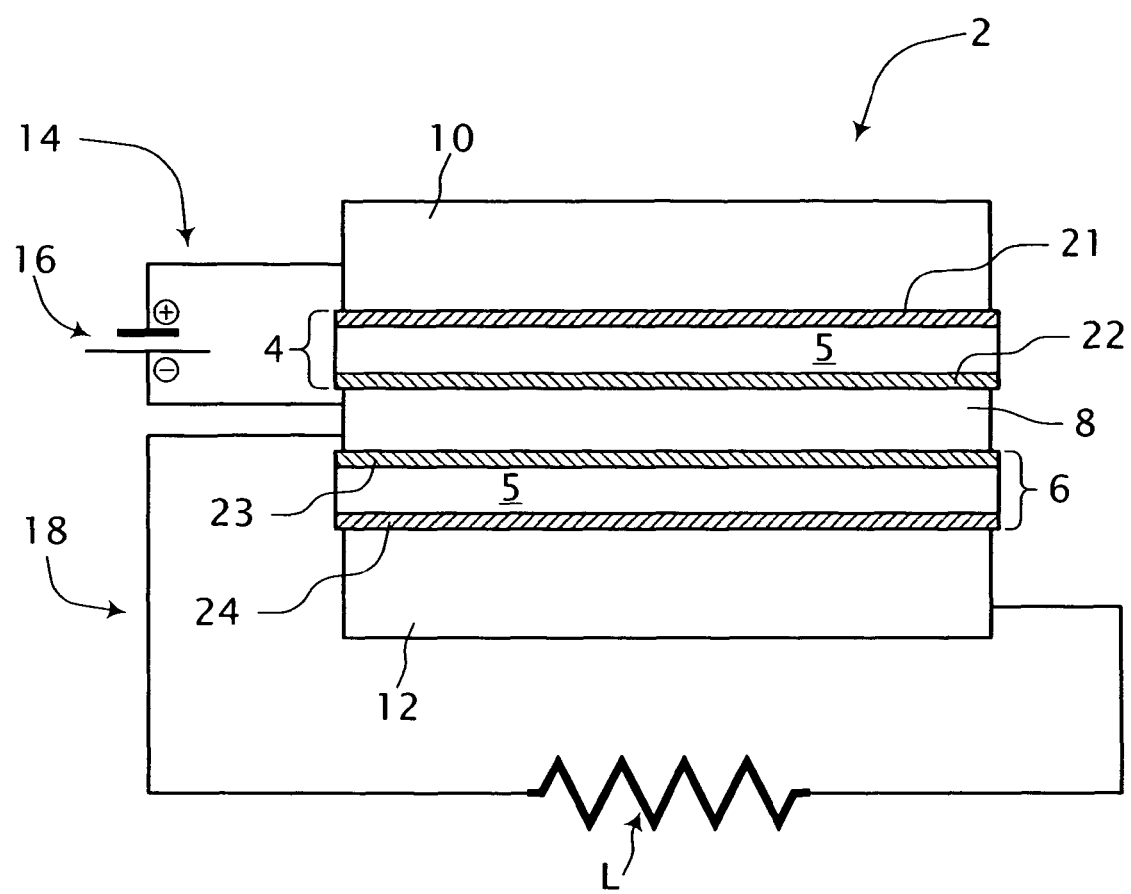
FIG. 1 is a schematic drawing of the fuel cell system of the present invention.

Referring to FIG. 1, a single cell fuel cell system is shown generally at 2. The fuel cell system 2 includes a first electrode-electrolyte assembly 4, a second electrode-electrolyte assembly 6 and an electrically conductive mesh 8 disposed therebetween and in sealing engagement therewith. A first conduit 10 is in fluid communication with one side of the first electrode-electrolyte assembly 4 and a second fluid conduit 12 is in fluid communication with one side of the second electrode-electrolyte assembly 6. At least portions of the first and second conduits 10, 12 comprise an electrically conductive material. The fuel cell system 2 includes a first electrical circuit 14 including an energy storage device 16 for providing process energy in the form of a first electrical potential across the first electrode-electrolyte assembly 4. In addition, an electrical load circuit 18 is connected across the second electrode-electrolyte assembly 6 for consuming energy output therefrom in the form of a second electrical potential generated thereacross. A plurality of the fuel cell systems 2 may be connected together in an electrical series circuit or arranged in a stack with suitable fluid distribution hardware. While the first electrical circuit 14 is shown to include an energy storage device 16, the present invention is not limited in this regard as a battery, capacitor, or a combination of a plurality thereof capable of providing the process energy can be used.

Figure 2:
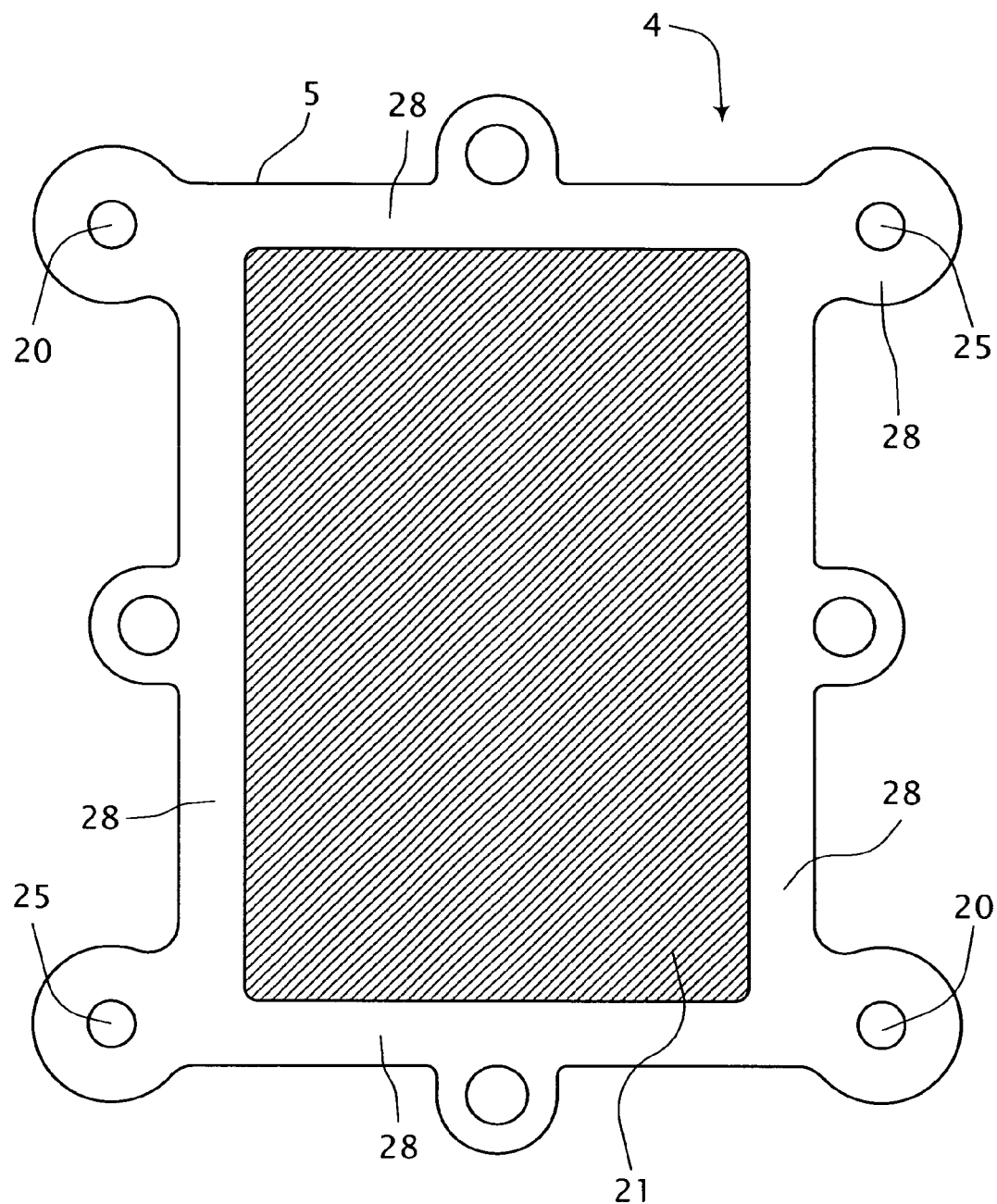
FIG. 2 is a top view of an electrode-electrolyte assembly.

Referring to FIGS. 1-2, the first electrode-electrolyte assembly 4 includes an electrolyte membrane 5, preferably formed of an ion exchanging polymer, the electrolyte membrane having a first electrode 21 and a second electrode 22 preferably catalytic electrodes hot-pressed onto opposing surfaces thereof. Similarly, the second electrode-electrolyte assembly 6 includes an electrolyte membrane 5, preferably formed of an ion exchanging polymer, the electrolyte membrane having a third electrode 23 and a fourth electrode 24 preferably catalytic electrodes hot-pressed onto opposing surfaces thereof. The polymer electrolyte membrane 5 is generally a soft compliant material, comprising any ion-conductive material and is generally a hydrocarbon resin or a fluorocarbon resin capable of facilitating ion transfer in two directions. For hydrocarbon resins, phenolic-based materials are of particular use. Fluorocarbon resins are particularly useful for providing resistance in chemically corrosive environments. Suitable materials from which the electrodes can be fabricated include, but are not limited to, platinum, palladium, rhodium, gold, tungsten, tantalum, ruthenium, and alloys and combinations of the foregoing. The present invention is not limited in this regard, and other membrane materials and electrode materials are within the scope of the invention.

The first electrode-electrolyte assembly 4 also includes through holes 20, 25 and a sealing area 28. The second electrode-electrolyte assembly 6 is configured similar to the first electrode-electrolyte assembly 4. The second and third electrodes 22 and 23 are in electrically conductive communication with the mesh 8, the first electrode 21 is in electrically conductive communication with the first fluid conduit 10 and the fourth electrode 24 is in electrically conductive communication with the second fluid conduit 12. When the first and second electrode-electrolyte assemblies are assembled with other componentry, the through holes 20, 25 define manifolds that provide fluid communication through the fuel cell system 2. While the first and second electrode-electrolyte assemblies 4, 6 are described as being similar to each other, the present invention is not limited in this regard as the first and second electrode-electrolyte assemblies can be configured differently including but not limited to using different materials for the first and second electrode-electrolyte assemblies and using different fabrication methods.

Referring to FIG. 1, when assembled, the first conduit 10 is in fluid communication with the first catalytic electrode 21 for delivering fuel to the first catalytic electrode at ambient temperature. Preferably, the temperature of the fuel is from about 60° F. to about 100° F. when delivered and during fuel processing for the formation of hydrogen thereby facilitating use of polymer electrolytes. Transient load following capability of the fuel cell system is enabled by processing fuel and operating the fuel cell at ambient temperatures because ramp-up time associated with heating the fuel cell and/or fuel processing system are eliminated. While ambient temperature operation from about 60° F. to about 100° F. is described, the present invention is not limited in this regard as the fuel cell system of the present invention may also be operated at temperatures up to about 180° F.

The second conduit 12 is in fluid communication with the fourth catalytic electrode 24 for delivering an oxidant thereto. Preferably, the first and second conduits 10, 12 are part of respective closed loop systems for delivering fuel to the first electrode 21 and delivering oxidant to the fourth electrode 24, respectively. Reaction products and excess heat are transported away from the fuel cell 2 by the fuel and oxidant flowing through the first and second conduits 10, 12 in the closed loop systems.

Still referring to FIG. 1, the energy storage device 16 has a positive terminal in electrically conductive communication with the first conduit 10 and the first catalytic electrode 21 and a negative terminal in electrically conductive communication with the mesh 8 and the second catalytic electrode 22. The energy storage device 16 in the first electrical circuit 14 is polarized to provide the process energy for an electrochemical reaction to form hydrogen and remove carbon monoxide (CO) poisons formed on first catalytic electrode 21. The hydrogen diffuses through the first electrode-electrolyte assembly 4 to the third catalytic electrode 23. Equation 1 (Eq. 1) illustrates the total electrochemical reaction across the first electrode-electrolyte assembly 4. In particular, Eq. 1 illustrates the formation of hydrogen species such as hydrogen ions ($H^+$) and the removal of CO poison from the first electrode 21 when the first electrical potential is applied across the first electrode-electrolyte assembly 4 in the presence of water on the first catalytic electrode.

$$CO + H_2O \rightarrow CO_2 + H_2 \qquad \text{Eq. 1}$$

The process energy for the electrochemical reaction illustrated in Eq. 1, is approximately 0.103 volts. The electrical energy output across the second electrode-electrolyte assembly 6 is greater than the process energy for the electrochemical reaction. For the second electrode-electrolyte assembly 6, the mesh 8 comprises the negative polarity terminal and the second conduit 12 comprises the positive terminal. Preferably the first conduit 10 is less positive than the second conduit 12. As shown in Eq. 1, water is one of the reactants required for the electrochemical reaction. Therefore, the conduits are preferably configured to deliver an aqueous solution of a fuel.

The Gibbs free energy for the reaction defines the maximum theoretical work that can be extracted by means of a specific reaction path. The heat of reaction is the enthalpy change that occurs in a system when one mole of matter is transformed by a chemical reaction under standard conditions. Thus, a fuel having the absolute value of the Gibbs free energy of reaction greater than the absolute value of the heat of reaction is preferred. In particular, complex organic fuels having more than one hydrogen bond are preferred. Suitable complex organic fuels include aqueous solutions of carbohydrates including but not limited to hexose $C_6H_{12}O_6$ which has a heat of reaction of −669.92 kcal/mole and a Gibbs free energy of −688.33 kcal/mole. Other complex organic fuels suitable for ambient temperature processing include hydrazine and most light hydrocarbons.

Figure 3:
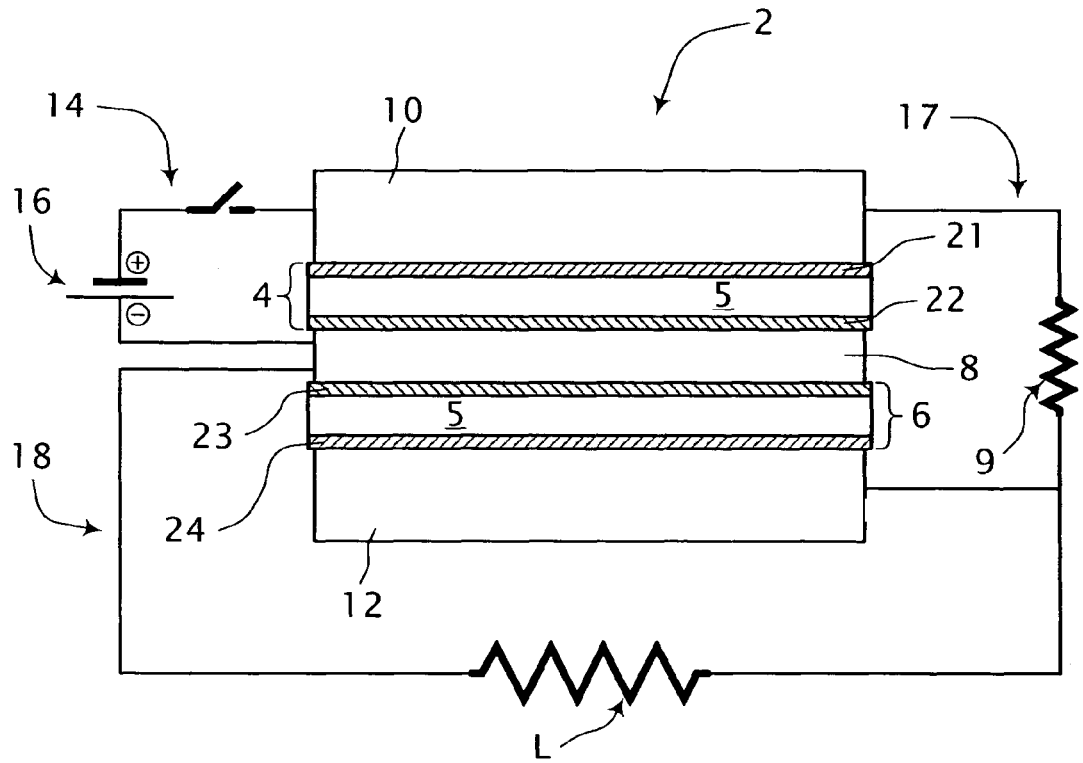
FIG. 3 is a schematic drawing of the present invention illustrating the process being provided by the energy output of the fuel cell.

Referring to FIG. 3, the energy storage device 16 is shown, after start-up of the fuel cell system 2, disconnected from the first electrical circuit 14 and a portion of the energy output across the second electrode-electrolyte assembly 6 is used to provide the process energy of the electrochemical reaction. The remainder of the electrical output is shown being consumed by a useful electrical load L connected in the electrical load circuit 18. The electrical energy output across the second electrode-electrolyte assembly 6 is greater than the process energy used in the electrochemical reaction.

FIG. 3 illustrates a ballast resistor 9 connected in a third electrical circuit 17. The ballast resistor 9 has one terminal in electrically conductive communication with the first conduit 10 and carries a positive charge. The ballast resistor 9 has another terminal in electrically conductive communication with the second conduit 12 and also carries a positive charge. The third electrical circuit 17 provides and regulates current flow from the electrical load circuit 18 to provide the process energy for the electrochemical reaction to form hydrogen. The third electrical circuit 17 diverts at least a portion of the current flow from the electrical load circuit 18. Current flowing through the electrical load circuit 18 is greater than current flowing through the third electrical circuit 17 for providing the process energy. The ballast resistor 9 regulates the flow of the electrical current through the third electrical circuit such that the first conduit 10 is at a less positive electrical potential than that at the second conduit 12. Although a ballast resistor 9 is illustrated for regulating current flow in the third electrical circuit 17, the present invention is not limited in this regard as other devices can also be used including, but not limited to, a semiconductor device and electronic current controls for a finer match between the fuel processing current and the external load.

Figure 4:
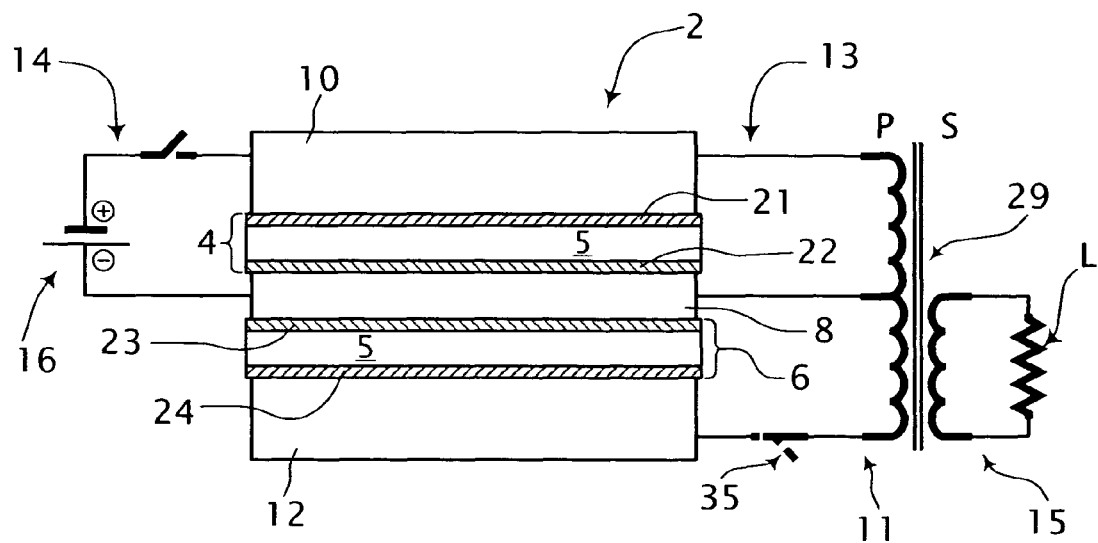
FIG. 4 is a schematic drawing of the fuel cell of FIG. 3 including an inductive device for providing the process energy.

Referring to FIG. 4, the energy storage device 16 is shown, after start-up of the fuel cell system 2, disconnected from the first electrical circuit 14. During operation, the fuel cell system is electrically connected to an inductive device 29 having a primary side P and a secondary side S. The primary side (P) comprises primary circuit 11 and a branch circuit 13. The primary circuit 11 includes a switching device 35 for the repeated opening and closing thereof to charge the inductive device 29. The primary circuit 11 is electrically connected across the second electrode-electrolyte assembly 6 thereby terminating at the second conduit 12 and the mesh 8. The branch circuit 13 has a terminal in electrically communication with the first conduit 10 and another terminal in electrically conductive communication with the mesh 8. The secondary side (S) comprises a secondary side circuit 15 and a load L. The primary, branch and secondary circuits 11, 13, and 15 are wired to produce the most negative polarity at the mesh 8, the second most negative polarity at the conduit 10 such that the conduit appears positive with respect to mesh 8 and the most positive at fluid conduit 12 upon the repeated opening and closing of the switching device 35.

Referring to FIG. 4, the primary circuit 11 consumes the electrical energy output across the second electrode-electrolyte assembly 6 by flowing current to the branch circuit 13 thereby providing the process energy of the electrochemical reaction. The remainder of the electrical energy output across the second electrode-electrolyte assembly 6 is consumed by charging the inductive device 29 for consumption by the useful electrical load L connected in the electrical load circuit 15. Although a portion of the electrical energy output across the second electrode-electrolyte assembly 6 is shown connected to the branch circuit and the remainder charging an inductive device, the present invention is not limited in this regard as other configurations are also within the scope of the present invention, including but not limited to consuming substantially the entire energy output for charging the inductive device to generate electrical current on the secondary side for the process energy and for consumption by a useful load.

Figure 5:
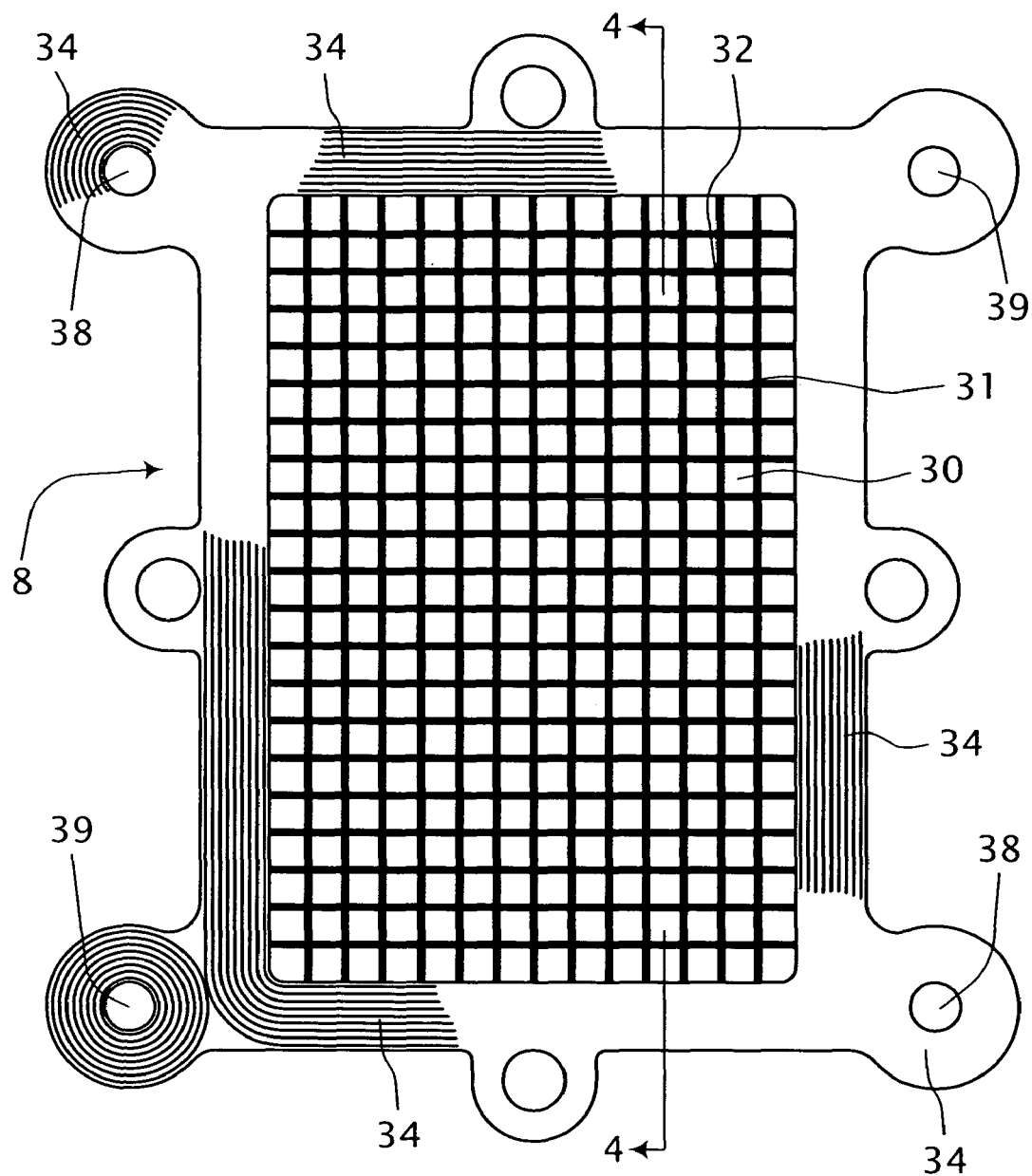
FIG. 5 is a top view of the mesh.
Figure 6:
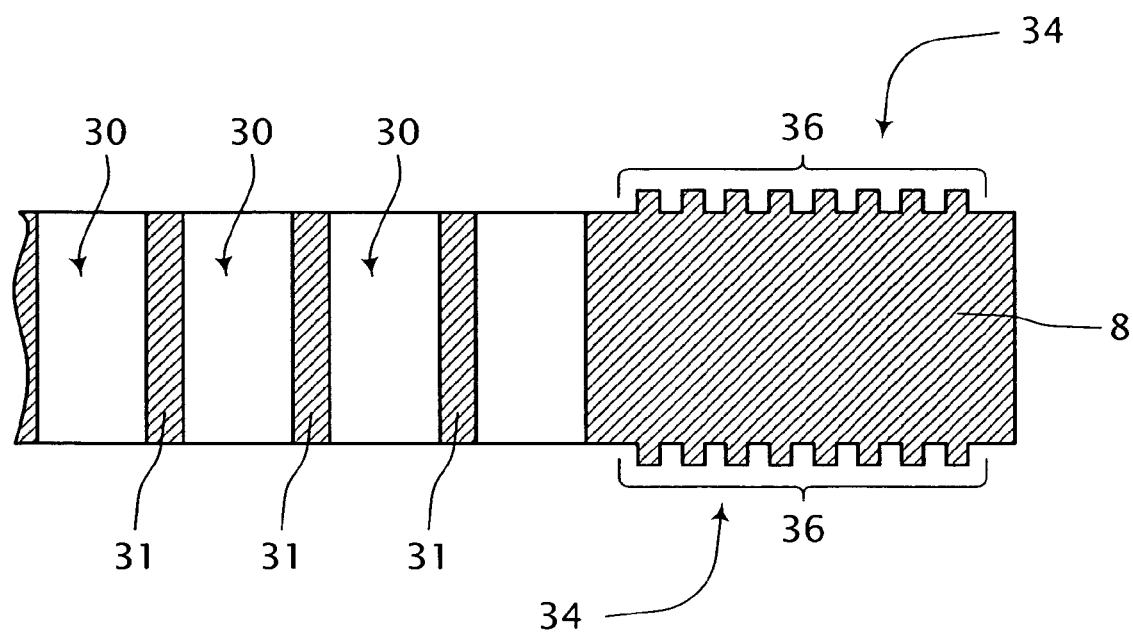
FIG. 6 is a cross sectional view of the mesh of FIG. 5.
Figure 7:
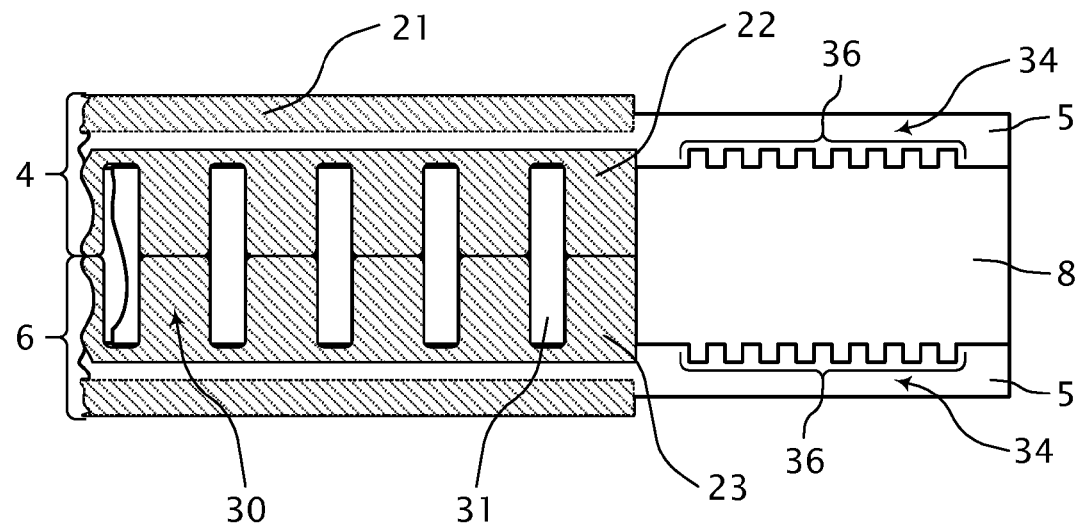
FIG. 7 is a cross sectional view of a portion of the mesh of FIG. 5 positioned between the first and second electrode-electrolyte assemblies.

The Referring to FIGS. 5-7, the mesh 8 comprises an electrically conductive material having a plurality of apertures 30 extending through a first active area 32. The apertures 30 are defined by a plurality of walls 31 spaced apart from one another such that, in the preferred embodiment, when the mesh is positioned between the first and second electrode-electrolyte assemblies 4, 6, portions of the second and third electrodes 22, 23 deform into the apertures 30 and engage each other. During operation of the fuel cell assembly 2, hydrogen species such as hydrogen ions diffuse from the first electrode-electrolyte assembly 4 to the second electrode-electrolyte assembly 6 through the portions of the second and third electrodes 22, 23 engaged each other. Preferably, the mesh 8 has a greater electrical conductivity than that of at least the electrodes 22, 23 for distributing electrical current throughout the first active area 32 and portions of the second and third electrodes engaged therewith. The mesh 8 provides electrical terminals for at least the first electrical circuit 14 and the electrical load circuit 18.

One side of the mesh 8 has a sealing area 34 substantially along the periphery thereof. The sealing area 34 comprises an interference pattern 36 (e.g., grooves) that forms a positive interlocking seal with the soft polymer material of the electrode-electrolyte assembly. The interference pattern 36 used for illustration includes a plurality of parallel ridges that form grooves. An opposing side of the mesh 8 has a similar sealing area and interference pattern. When the mesh 8 is positioned between the first and second electrode-electrolyte assemblies the ridges of the sealing area 34 are pressed onto the material of the electrode-electrolyte assemblies and can deform to ensure fluid containment in their respective designated cavities.

Referring back to FIG. 5, the mesh 8 also includes through holes 38, 39. When the mesh 8 is assembled with other componentry, the through holes 38, 39 define manifolds that provide fluid communication through the fuel cell system 2. The sealing area 34 also extends substantially around the perimeter of the through holes 38, 39.

Figure 8:
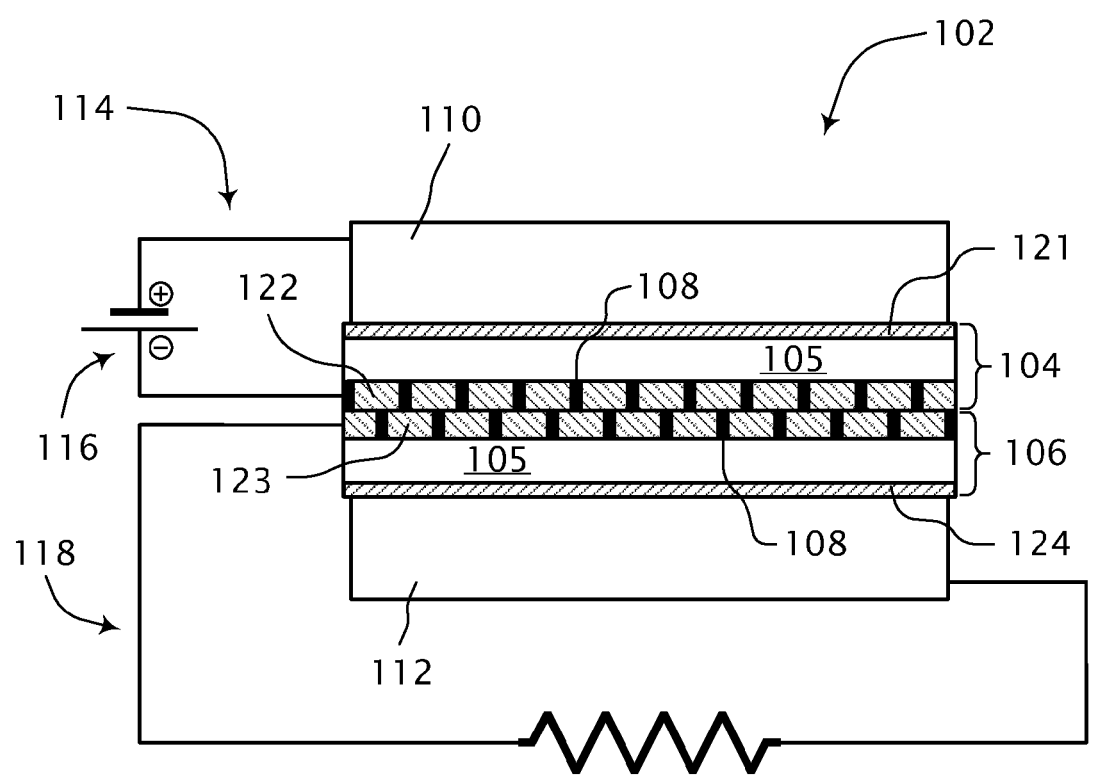
FIG. 8 is a cross sectional view of the fuel cell system having meshes embedded in the electrodes.

Referring now to FIG. 8, the fuel cell system is shown generally at 102. The fuel cell system 102 includes a first electrode-electrolyte assembly 104 and a second electrode-electrolyte assembly 106. The first electrode-electrolyte assembly 104 includes an electrolyte membrane 105, preferably formed of an ion exchanging polymer, the electrolyte membrane having a first electrode 121 and a second electrode 122, preferably catalytic electrodes hot pressed onto opposing surfaces thereof. The second electrode 122 includes an electrically conductive mesh 108 embedded therein. Similarly, the second electrode-electrolyte assembly 104 includes an electrolyte membrane 105, preferably formed of an ion exchanging polymer, the electrolyte membrane having a third electrode 123 and a fourth electrode 124, preferably catalytic electrodes hot pressed onto opposing surfaces thereof. The third electrode 123 includes an electrically conductive mesh 108 embedded therein. A first conduit 110 is in fluid communication with first electrode 121 and a second fluid conduit 112 is in fluid communication with the fourth electrode 124. The first and second electrode-electrolyte assemblies 104, 106, and the first and second conduits 110, 112 are in electrically conductive communication with one another. The fuel cell system 102 includes a first electrical circuit 114 including an energy storage device 116 for providing a first electrical potential across the first electrode-electrolyte assembly 104. In addition, an electrical load circuit 118 is connected across the second electrode-electrolyte assembly 106 for consuming an energy output in the form of a second electrical potential generated thereacross.

The meshes 108 are similar to the mesh 8 described above. In particular, preferably, the meshes 108 have a greater electrical conductivity than that of at least the electrodes 122, 123 for distributing electrical current throughout portions of the second and third electrodes 122, 123. The meshes 108 provide electrical terminals at least for the first electrical circuit 114 and the electrical load circuit 118. When assembled, the second and third electrodes 122, 123 are positioned adjacent to and engaged with one another.

Figure 9:
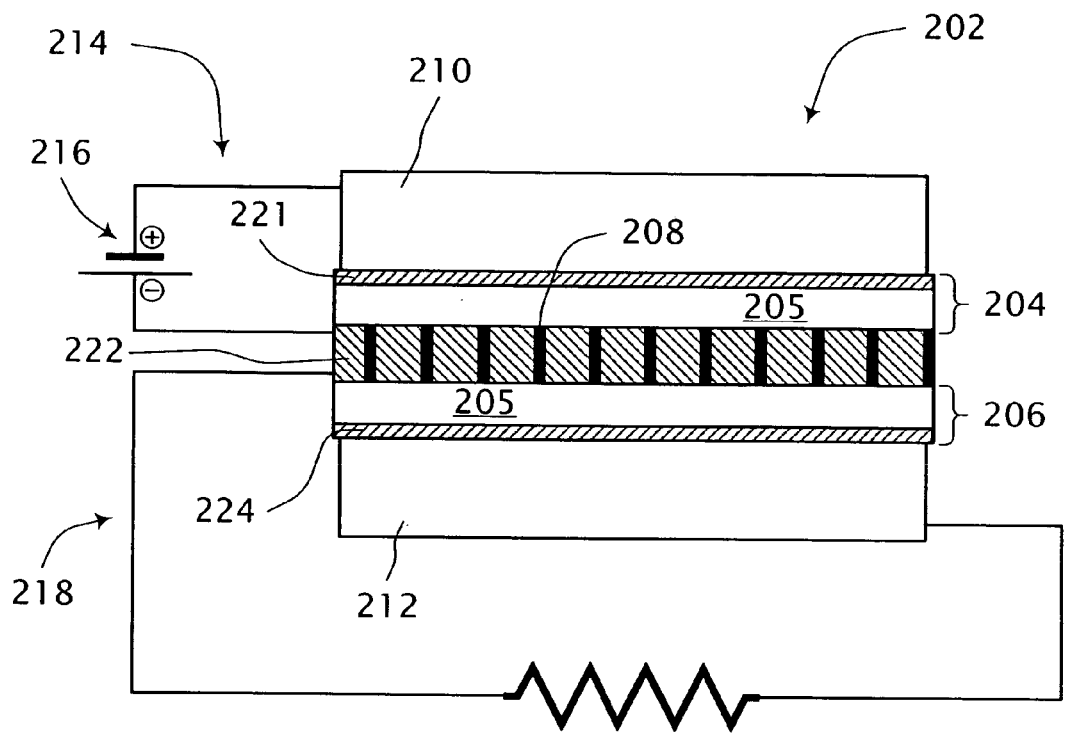
FIG. 9 is a cross sectional view of the fuel cell system including a common electrode having a mesh embedded therein.

Referring now to FIG. 9, the fuel cell system is shown generally at 202. The fuel cell system 202 includes a first electrode-electrolyte assembly 204 and a second electrode-electrolyte assembly 206. The first electrode-electrolyte assembly 204 includes an electrolyte membrane 205, preferably formed of an ion exchanging polymer, the electrolyte membrane having a first electrode 221, preferably a catalytic electrode hot pressed onto one surface thereof. The fuel cell system includes second and third electrodes combined into one common electrode 222 having an electrically conductive mesh 208 embedded therein. The second electrode-electrolyte assembly 204 includes an electrolyte membrane 205, preferably formed of an ion exchanging polymer, the electrolyte membrane having a fourth electrode 224, preferably a catalytic electrode hot pressed onto opposing surfaces thereof. The common electrode 222 is disposed between membrane surfaces 205 of the first and second electrode-electrolyte assemblies. A first conduit 210 is in fluid communication with first electrode 221 and a second fluid conduit 212 is in fluid communication with the fourth electrode 224. The first and second electrode-electrolyte assemblies 204, 206, and the first and second conduits 210, 212 are in electrically conductive communication with one another. The fuel cell system 202 includes a first electrical circuit 214 including an energy storage device 216 for providing a first electrical potential across the first electrode-electrolyte assembly 204. In addition, an electrical load circuit 218 is connected across the second electrode-electrolyte assembly 206 for consuming an energy output in the form of a second electrical potential generated thereacross.

The mesh 208 is similar to the mesh 8 and 108 described above. In particular, preferably, the mesh 208 has a greater electrical conductivity than that of at least the common electrode 222 for distributing electrical current throughout portions thereof. The mesh 208 provides electrical terminals at least for the first electrical circuit 214 and the electrical load circuit 218.

Figure 10:
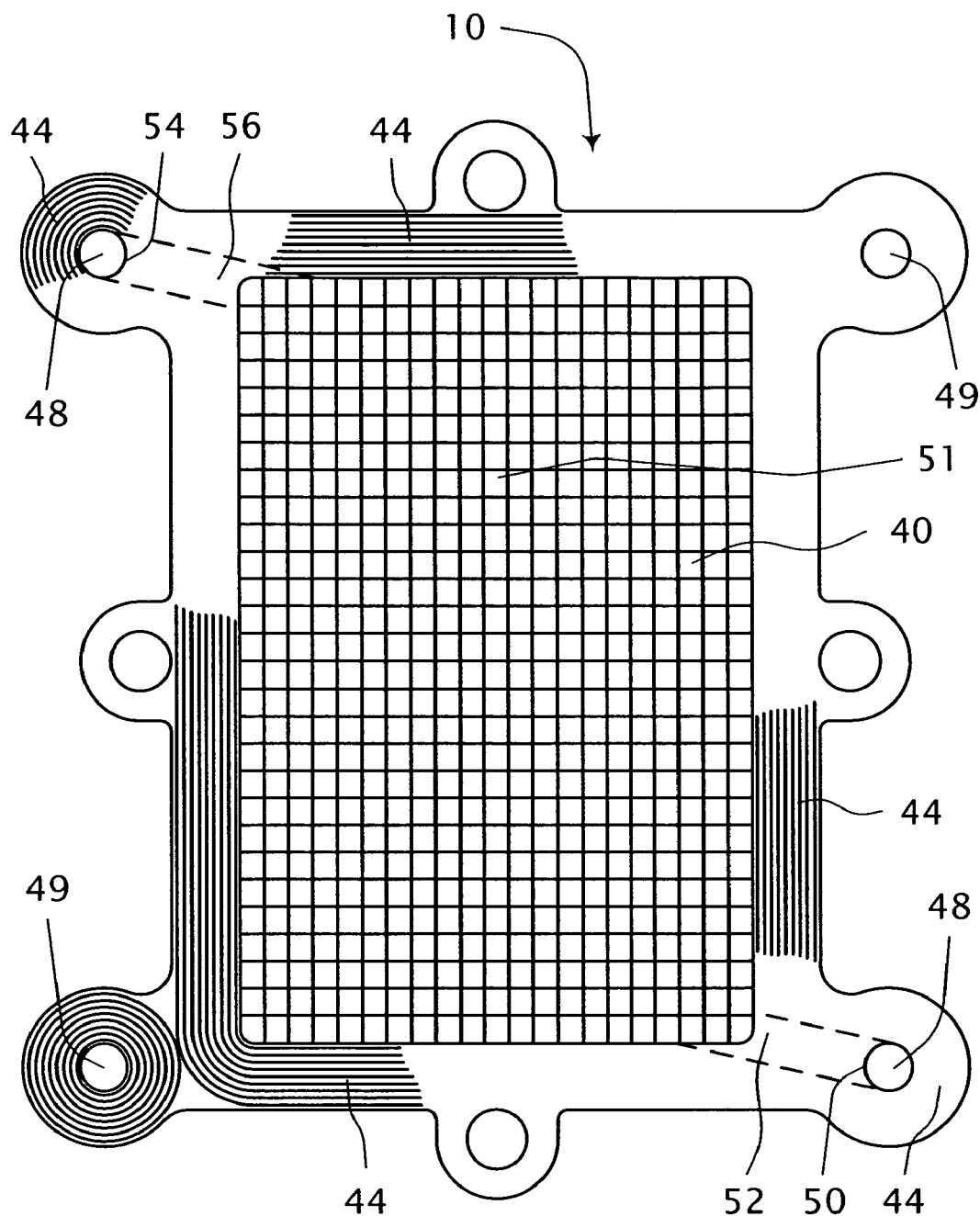
FIG. 10 is a top view of a conduit.

Referring now to the exemplary embodiment in FIG. 10, an electrode-side of the conduit 10 includes a second active area 51 defined by a plurality of passages 40, through which fluid communication can be maintained between the adjacently positioned first catalytic electrode. Preferably, at least portions of the conduit 10 have a greater electrical conductivity than that of the catalytic electrodes for distributing electrical current throughout the second active area 51 and portions of the first catalytic electrode engaged therewith. The first conduit 10 provides an electrical terminal for the first electrical circuit 14. A second conduit 12 provides an electrical terminal for the electrical load circuit 18. While the conduits 10 and 12 are described as providing electrical terminals, the present invention is not limited in this regard, as separate electrical terminals in electrically conductive communication with the conduits are also within the scope of the present invention.

The electrode-side of the conduit 10 has a sealing area 44 substantially along the periphery thereof. The sealing area 44 has an interference pattern (e.g., grooves) that forms a positive interlocking seal with the soft polymer material of the electrode/electrolyte assembly, similar to that described above for the mesh 8. The electrode-side also includes through holes 48, 49. When the fluid conduit 10 is assembled with other componentry, the through holes 48, 49 define manifolds that provide fluid communication through the fuel cell system 2. The sealing area 44 also extends substantially around the through holes 48, 49.

Figure 11:
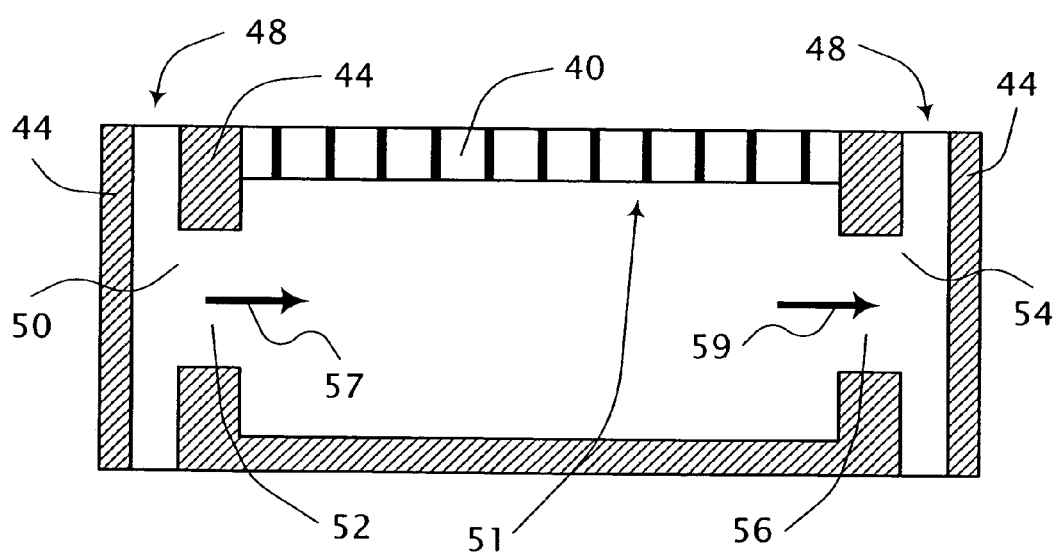
FIG. 11 is a schematic drawing of a cross section of the conduit.

Referring now to FIGS. 10 and 11 the conduit includes a flow distribution inlet 50 and a flow distribution structure 52. The conduit also includes a flow distribution outlet 54 and a flow distribution receiving structure 56. The flow distribution inlet 50 is in fluid communication with the through hole 48 and provides process fluid to the flow distribution structure 52. The flow distribution structure 52 distributes the process fluid to the second active area 51, generally in the direction of the arrow 57, which allows the fluid to be dispensed through the second active area 51 of conduit over the surface area of the electrode-electrolyte assembly when assembled. Excess fluid in the second active area 51 is received in the flow distribution receiving structure 56, which channels the process fluid, in the general direction of the arrow 59, to the flow distribution outlet 54 and to the through hole 48 that defines part of the outlet manifold of the cell. The second fluid conduit 12 is similar in configuration to and has materials of manufacture similar to that of the first conduit 10.

Figure 12:
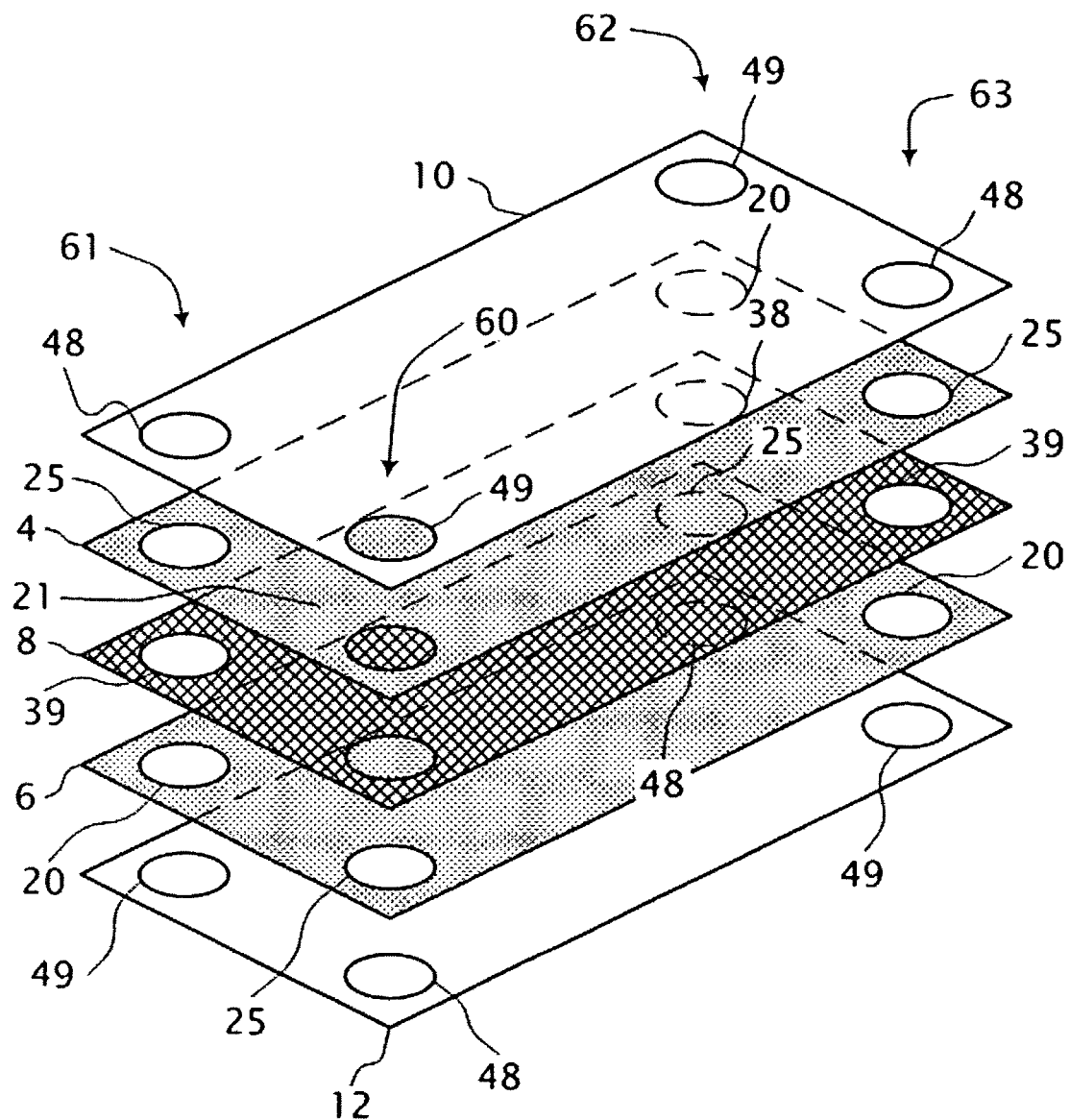
FIG. 12 is a schematic drawing of an exploded view of an assembled fuel cell system.

Referring now to FIG. 12, the assembled fuel cell system 2, comprises the first electrode-electrolyte assembly 4, the second electrode-electrolyte assembly 6 and the electrically conductive mesh 8 disposed therebetween and in sealing engagement therewith. The first conduit 10 is in fluid communication with one side of the first electrode-electrolyte assembly 4 and the second fluid conduit 12 is in fluid communication with one side of the second electrode-electrolyte assembly 6. The fuel cell system 2 is assembled such that through holes 49, 20, 38, 25 and 48 of each respective component are aligned to define inlet fluid manifolds 60; through holes 48, 25, 39, 20 and 49 of each respective component are aligned to define inlet fluid manifolds 61; through holes 49, 20, 38, 25 and 48 of each respective component are aligned to define outlet fluid manifold 62; and through holes 48, 25, 39, 20 and 49 of each respective component are aligned to define outlet fluid manifold 63.

Figure 13:
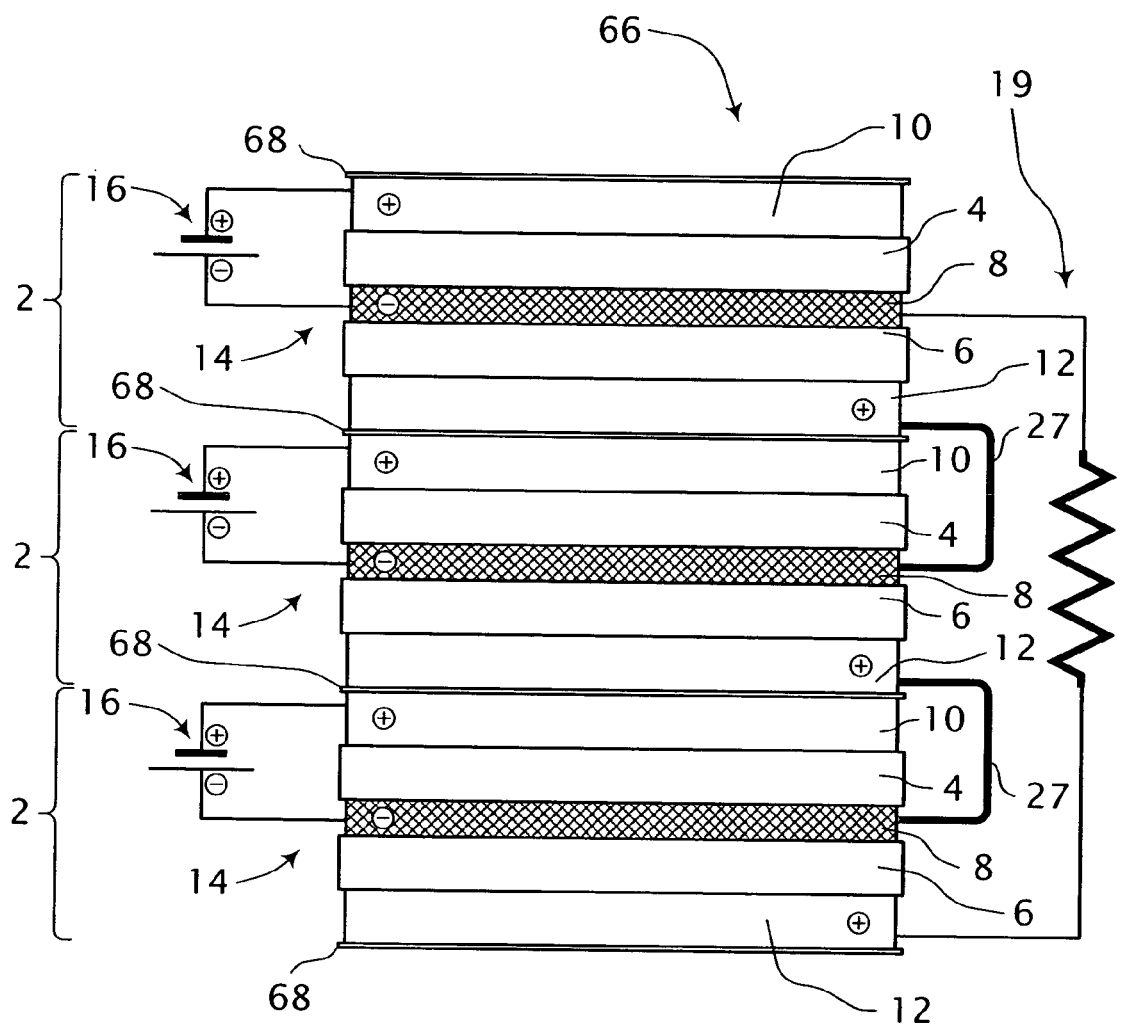
FIG. 13 is a schematic drawing of a plurality of fuel cell systems of FIG. 1 arranged in a stack.

Referring to FIG. 13, it is sometimes advantageous to assemble a plurality of fuel cell systems 2 in a stack 66. The stack 66 configuration illustrates the individual fuel cell systems 2 connected electrically in series using conductors 27, and the flow of fuel and oxidant through the respective fluid conduits is managed in a parallel flow configuration wherein dielectric separators 68 are disposed between adjacent fuel cell systems and upon terminating ends thereof. Each of the fuel cell systems 2 comprises the first electrical circuit 14 including the energy storage device 16 for providing a first electrical potential across the first electrode-electrolyte assembly 4. In addition, an electrical load circuit 19 is connected between the mesh 8 of a fuel cell system 2 on one end of the stack 66, and the fluid conduit 12 of a fuel cell system on the opposing end of the stack for consuming energy output in the form of a second electrical potential generated thereacross. Electrically conductive communication is provided between the second fluid conduit 12 of one fuel cell system 2 and the mesh 8 of an adjacent fuel cell system by conductors 27. In particular, the fuel cell systems 2 are shown connected to each other in an electrical series circuit. The stack 66 is configured to operate similar to that described above for the single cell fuel cell systems 2 of FIG. 1. Although individual fuel cell systems 2 are shown connected electrically in series using conductors 27, and the flow of fuel and oxidant through the respective fluid conduits is managed in a parallel flow configuration, it the present invention is not limited in this regard as other fuel cell system stacking configurations are also within the scope of the present invention.

Figure 14:
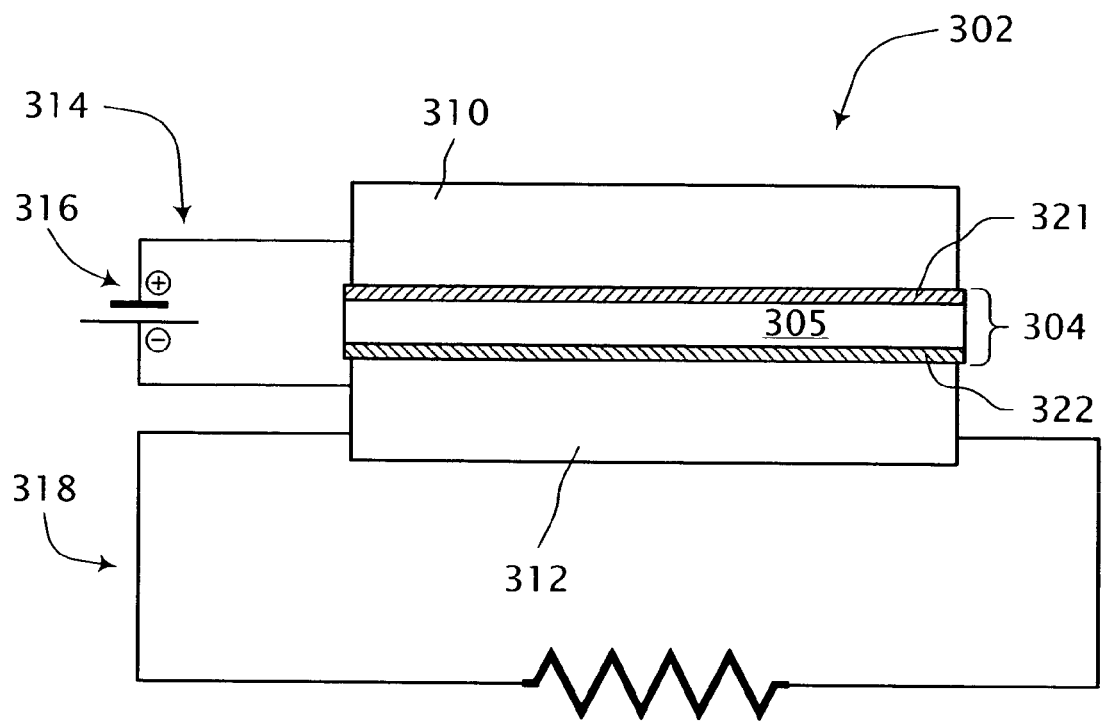
FIG. 14 is a schematic drawing of a fuel cell system having one electrode-electrolyte assembly.

Referring to FIG. 14, a single cell fuel cell system 302 comprises an electrolyte assembly 304 which operates alternately as fuel processing and fuel cell device. The electrode-electrolyte assembly 304 is disposed between a first conduit 310 and a second conduit 312. The electrode-electrolyte assembly 304 includes a first catalytic electrode 321 coupled to one side of the electrode-electrolyte assembly and a second catalytic electrode 322 coupled to a generally opposing side of the electrode-electrolyte assembly. The electrode-electrolyte assembly 304 includes an electrolyte membrane 305, preferably formed of an ion exchanging polymer similar to that described above for the electrode-electrolyte assembly 4.

The first conduit 310 is in fluid communication with the first catalytic electrode 321 for delivering fuel thereto at ambient temperature. The second conduit 312 is in fluid communication with the second catalytic electrode for delivering an oxidant thereto. The fuel cell system 302 includes a first electrical circuit 314 including an energy storage device 316 for providing a first electrical potential across the electrode-electrolyte assembly 304. In addition, an electrical load circuit 318 is connected across the electrode-electrolyte assembly 304 for consuming energy output in the form of a second electrical potential generated thereacross. A plurality of the fuel cell systems 302 may be connected individually together in an electrical series circuit or arranged in a stack with suitable fluid distribution hardware. While the first electrical circuit 314 is shown to include an energy storage device 316, the present invention is not limited in this regard as a battery, capacitor or a combination of a plurality thereof can be used.

The electrode-electrolyte assembly 304 and the conduits 310, 312 have though holes aligned to form manifolds. The conduits 310, 312 have sealing areas to provide sealing engagement with the electrode-electrolyte assembly; and flow distribution inlets, flow distribution structures, flow distribution outlets and a flow distribution receiving structures. In addition, the fuel cell system 302 is similarly configured to the fuel cell system 2 for processing aqueous solutions of complex organic fuels at ambient temperature.

Referring to FIG. 14, the energy storage device 316 has a positive terminal in temporary electrically conductive communication with the first conduit 310 and first catalytic electrode 321 and a negative terminal in intermittent electrically conductive communication with the second conduit 312 and the second catalytic electrode 322. The conduit 310 is generally used for supplying an organic fuel to the catalytic electrode 321 and the conduit 312 is generally used for supplying an oxidant to the catalytic electrode 322. The polarity of the energy storage device 316 in the first electrical circuit 314 thus provides the process energy for an electrochemical reaction to remove carbon monoxide (CO) poisons formed on first catalytic electrode 321 and form hydrogen species. The hydrogen diffuses through the electrode-electrolyte assembly 304. An electrical load circuit 318 is intermittently connected across the electrode-electrolyte assembly for consuming energy output in the form of the second electrical potential generated therefrom.

Figure 15:
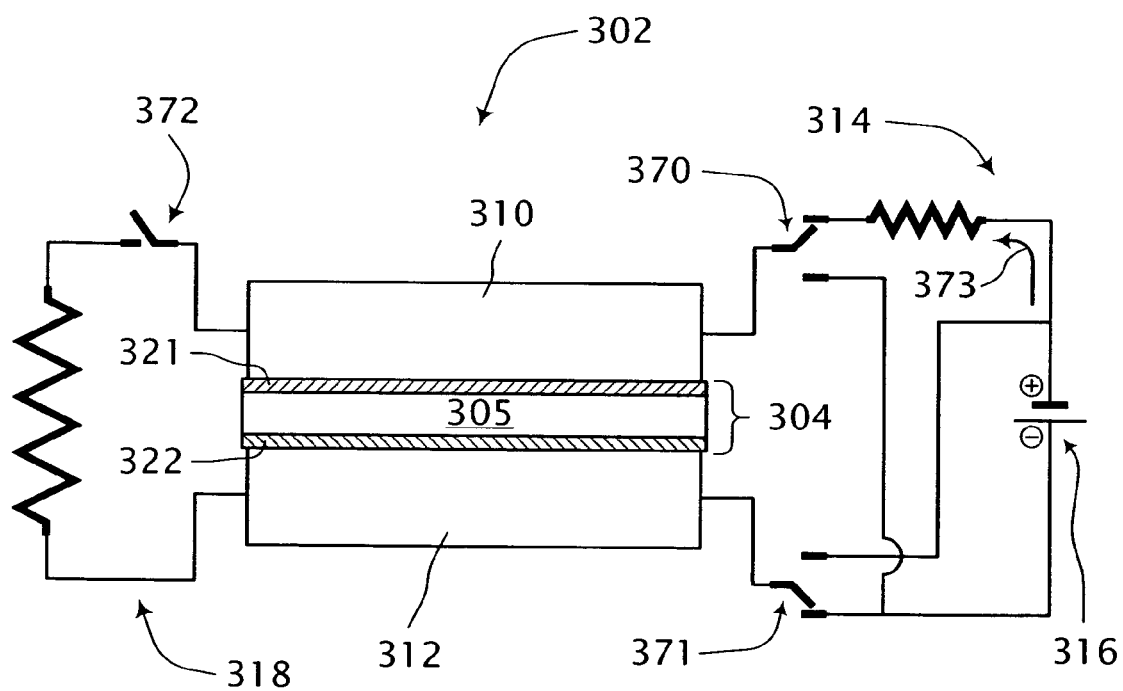
FIG. 15 is a schematic drawing of the fuel cell system of FIG. 14 shown with the electrical load circuit de-energized.
Figure 16:
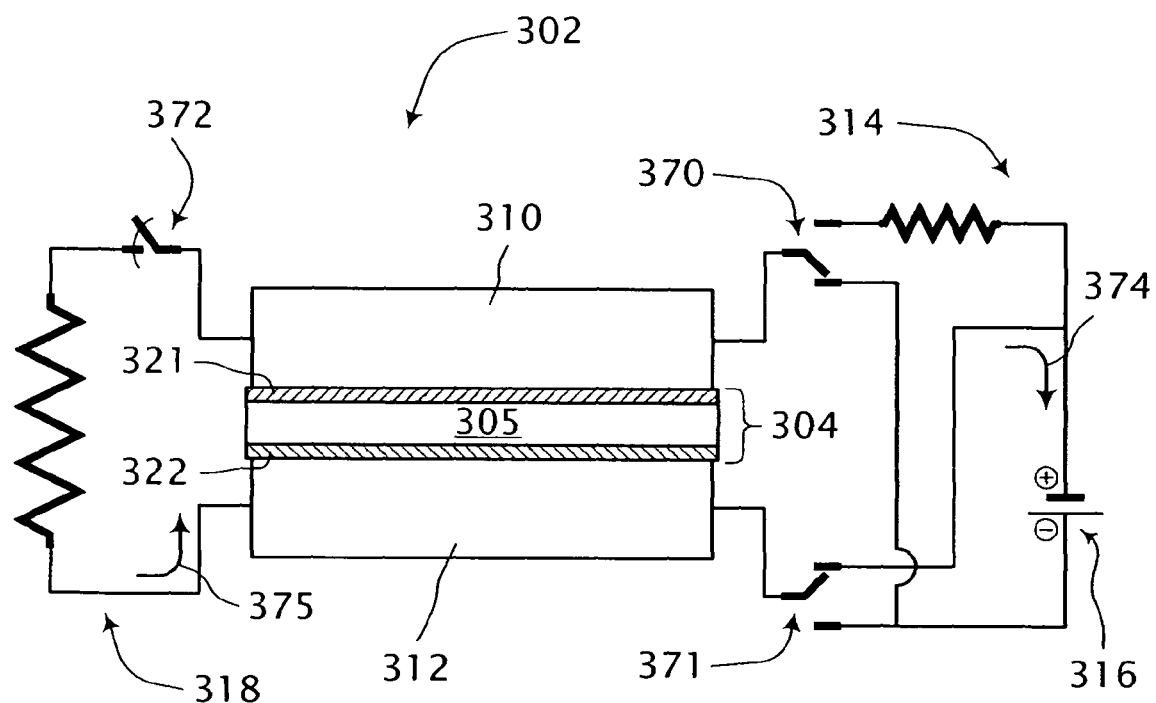
FIG. 16 is a schematic drawing of the fuel cell system of FIG. 14 shown with the electrical load circuit energized.

Referring now to FIGS. 15-16 the first electrical circuit 314 and the electrical load circuit 318 are interlocked such that during operation the first electrical circuit is energized for at least a portion of a period of time when the electrical load circuit is de-energized and the electrical load circuit is energized for at least a portion of a following period of time when the first electrical circuit is de-energized. During operation the electrical load circuit 318 is alternately opened and closed for a first predetermined period of time while the first electrical circuit 314 is cyclically toggled between fuel processing and storage recharge for a second predetermined period of time.

Referring now to FIG. 15, the fuel cell system 302 is illustrated in a fuel processing cycle wherein switches 370 and 371 are in fuel processing positions such that a positive terminal of an energy storage device 316 is in electrically conductive communication with the first catalytic electrode 321 and a negative terminal of the energy storage device in electrically conductive communication with the second catalytic electrode 322 causing electrical current to flow in the first electrical circuit 314 in the direction of the arrow 373. During the fuel processing cycle, switch 372 is positioned to open the electrical load circuit 318 resulting in no current flow therethrough. During the fuel processing cycle, the energy storage device provides the process energy for removing carbon monoxide (CO) poisons formed on first catalytic electrode 321, and for the electrochemical reaction for formation of hydrogen.

Referring now to FIG. 16, the fuel cell system 302 is illustrated in a power generation cycle wherein the position of switches 370 and 371 change to recharge positions such that the positive terminal of the energy storage device 316 is in electrically conductive communication with the second catalytic electrode 322 and the negative terminal of the energy storage device is in electrically conductive communication with the first catalytic electrode 321 causing electric current to flow in the first electrical circuit 314 in the direction of the arrow 374, thereby replenishing the energy storage device 316. In addition, the switch 372 is positioned to close the electrical load circuit 318 thereby providing the energy output in the form of the second electrical potential and causing electrical current to flow in the direction of arrow 375.

Figure 17:
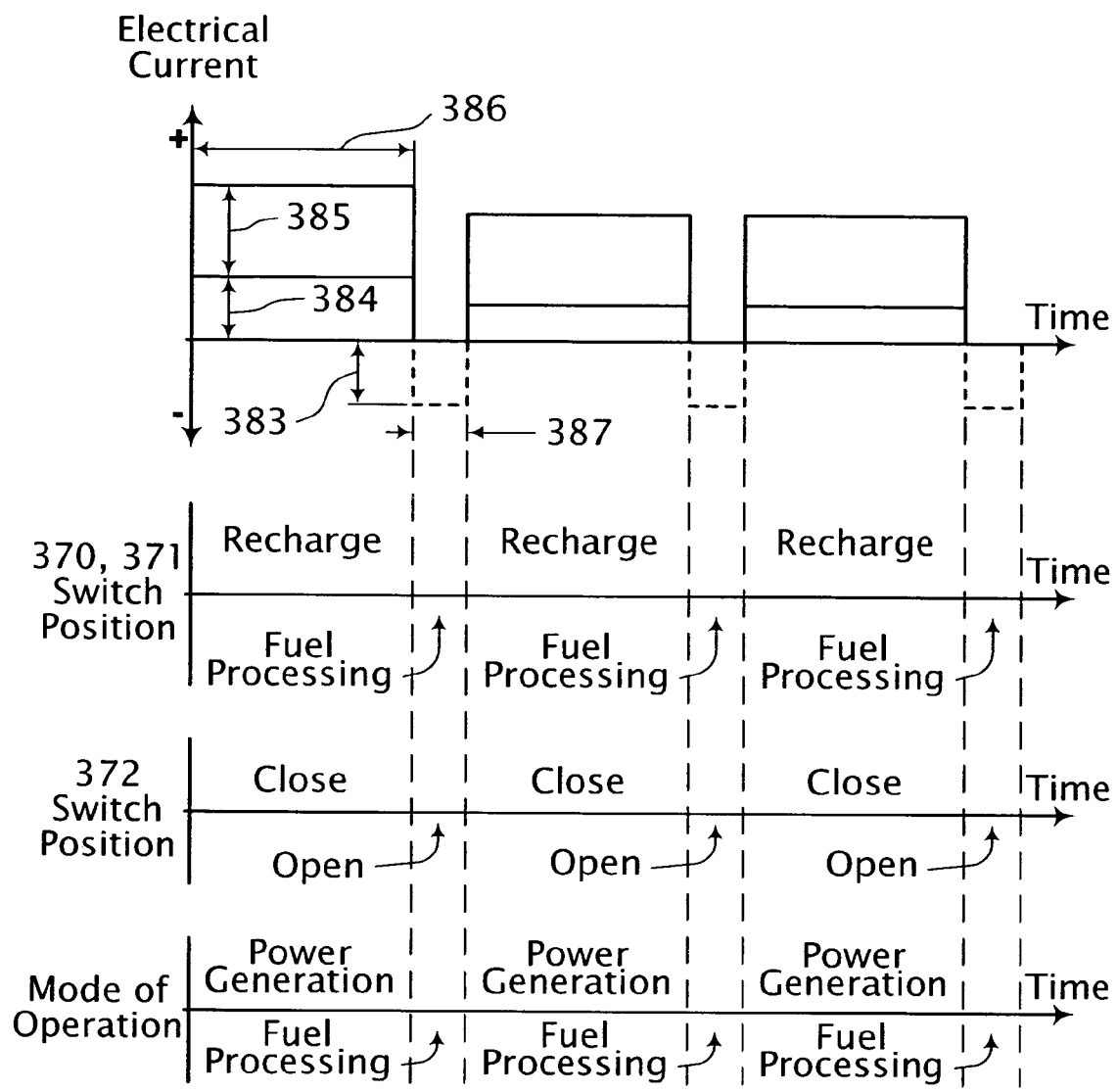
FIG. 17 is a graph of operational parameters of the fuel cell system during fuel processing and power generation cycles.

Referring to FIGS. 15-17, during the power generation cycle, the electric current is shown as positive value when switch 372 is closed and switches 370, 371 are in the recharge positions. The relative magnitude of the electric current flowing in the first electrical circuit 314 for recharging the energy storage device 316 is illustrated on FIG. 17 as arrow 384; and the relative magnitude of the excess electrical current flowing in the second electrical circuit 318 for consumption by the electrical load is illustrated on FIG. 17 as arrow 385. Preferably, the magnitude of the electrical current required for recharging the energy storage device 316 is less than that available for consumption by the electrical load. In addition it is preferred that the total energy consumed for recharging is less than the energy available for consumption by the electrical load during the entire power generation cycle.

Still referring to FIGS. 15-17, during the fuel processing cycle, electrical current flowing from the energy storage device 316 is shown as a negative value when switches 370, 371 are in the fuel processing positions and switch 372 is open. The magnitude of the electrical current required to provide the process energy for the hydrogen formation reaction is illustrated on FIG. 17 as arrow 383. During the fuel processing cycle, essentially no current flows in the second electrical circuit 318. Preferably, the process energy is less than the total energy available for consumption by the electrical load.

In addition, a first period of time 387 during which switches 370, 371 are in the fuel processing positions and switch 372 is open is preferably less than a second period of time 386 during which switch 372 is closed and switches 370, 371 are in the recharge positions. Preferably, the first period of time 387 is from about 0.01 seconds to about 10 seconds and the second period of time 386 is from about 0.5 minutes to about 10 minutes. Such cyclical switching between the fuel processing and the power generating cycles allows one electrode-electrolyte membrane to be used for both fuel processing and power generation, thus reducing the complexity of the fuel cell system 302.

While the first and second periods of time are preferred to be from about 0.01 seconds to about 10 seconds and from about 0.5 minutes to about 10 minutes, respectively, the present invention is not limited in this regard as other time durations may be used including but not limited to a performance based control including selecting the second period of time considering parameters indicative of degradation of power generation performance and selecting the first period of time based on fuel processing requirements corresponding to the magnitude of poisons formed on first catalytic electrode 21 during the power generation cycle. Selecting the first and second periods of time in this manner can increase overall power output and minimize energy requirements for fuel processing thereby improving fuel cell system efficiency. Parameters indicative of degradation of power generation performance used in the performance based control include fuel temperature, electrode temperature, fuel flow rate, oxidant flow rate, electric load, power output, and voltage across the fuel cell system and individual cells.

Figure 18:
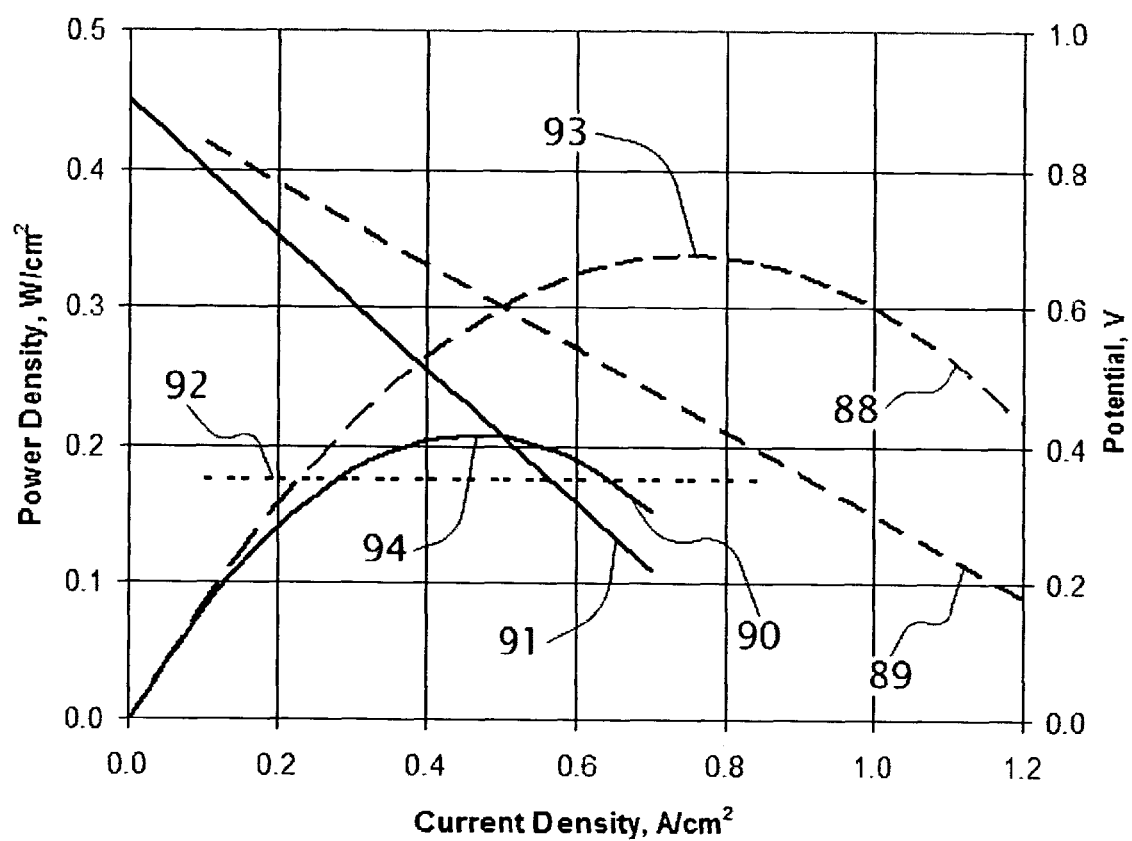
FIG. 18 is a graph of voltage and power density as a function of current density for the fuel cell system.

As shown in FIG. 18, curve 88, the initial power density of the fuel cell system varies as a function of current density. Similarly, curve 89 illustrates the initial voltage across the fuel cell system varies as a function of current density. The fuel cell system illustrated has a peak power density of approximately 0.34 W/cm$^2$ as designated by point 93. After three minutes of operation, poisons build up on the first catalytic electrode 21 resulting in a degradation of fuel cell system performance. After the three minute period of operation, power density of the fuel cell is degraded as illustrated by curve 90 and voltage across the fuel cell system is degraded as illustrated by curve 91. The degradation in fuel cell performance reduces the peak power density to approximately 0.21 W/cm$^2$, as illustrated by point 94. Power output of the fuel cell system is consumed by an external load of approximately 0.175 W/cm$^2$ as illustrated by line 92. The performance based control logic temporarily interrupts power generation in order to remove poisons from the first catalytic electrode 21 in the fuel reprocessing cycle, prior to the peak power density 94 decreasing below the external load 92. The performance based control logic is advantageous for fuel cells required to supply power for transient loads because the second period of time can be adjusted as a function of load.

Referring to FIG. 19, the fuel cell systems 302 can be assembled in a bipolar stack 366. Each of the fuel cell systems 302 include an electrode-electrolyte assembly 304 disposed between a first fluid conduit 310 and a second-fluid conduit 312. For illustration, a plurality of fuel cell systems 302 can be assembled in the bipolar stack 366 using bipolar separator plates 369 positioned between adjacent first conduits 310 and second conduits 312 for maintaining electrically conductive communication therebetween. A first terminal conductor 377 is positioned on one end of the fuel cell system 302 between a dielectric cover 368 and the first conduit 310 adjacent thereto; and a second terminal conductor 379 is positioned on an opposing end of the fuel cell system between another of the dielectric covers and the second conduit 312 adjacent thereto. The first and second terminal conductors 377, 379 engage adjacent first and second conduits 310, 312, respectively to provide electrically conductive communication therewith. The dielectric covers insulate terminal ends of the bipolar stack 366.

The fuel cell system 302 also includes a first electrical circuit 314 having an energy storage device 316 for providing an electrical potential across the first and second terminal conductors 377, 379. An electrical load circuit 318 is also connected across the first and second terminal conductors 377, 379 for consuming electrical energy output therefrom. The first electrical circuit 314 is shown with switches 370, 371 in the fuel processing cycle and switch 372 in the open position. The bipolar stack 366 includes interlocking circuitry and is configured to operate similar to that described above for the single cell fuel cell systems 302 of FIGS. 11-14.

The present invention includes a method for operating a fuel cell system 2. The method for operating the fuel cell system 2 includes the first step of providing a first electrode-electrolyte assembly 4 having a first catalytic electrode 21 coupled to one side of the first electrode-electrolyte assembly, and a second catalytic electrode 22 coupled to a generally opposite side of the first electrode-electrolyte assembly, a first conduit 10 in fluid communication with the first catalytic electrode; a second electrode-electrolyte assembly 6 having a third catalytic electrode 23 coupled to one side of the second electrode-electrolyte assembly, and a fourth catalytic electrode 24 coupled to a generally opposite side of the second electrode-electrolyte assembly, an electrically conductive mesh 8 having a plurality of apertures extending therethrough, the mesh being positioned between and in sealing engagement with the second catalytic electrode and the third catalytic electrode wherein the second and third catalytic electrode engage each other through the apertures, a second conduit 12 in fluid communication with the fourth catalytic electrode, a first electrical circuit 14 including an electrical energy storage device 16 and an electrical load circuit 18.

The method of operating the fuel cell system 2 also includes the steps of flowing an aqueous solution of a fuel having a complex organic structure through the first conduit 10, preferably the fuel being at ambient temperature for at least a portion of time during operation of the fuel cell system and flowing an oxidant through the second fluid conduit 12. The method of operating the fuel cell system 2 further includes the steps of establishing electrically conductive communication between a positive terminal of the energy storage device 16, the first conduit 10 and the first catalytic electrode 21. Electrically conductive communication is also established between a negative terminal of the energy storage device 16, the mesh 8 and the second catalytic electrode 22. Connecting the energy storage device in this manner provides the process energy for activating an ambient temperature electrochemical reaction to form hydrogen and remove poisons from the first catalytic electrode.

The method of operating the fuel cell system 2 also includes the steps of charging the first catalytic electrode with hydrogen and diffusing the hydrogen through the first electrode-electrolyte assembly to the third catalytic electrode. By connecting the electrical load circuit having an electrical consumer, across the second electrode-electrolyte assembly an energy output is generated across the second electrode-electrolyte assembly which causes the hydrogen to be consumed from the third catalytic electrode 23 and the oxidant to be consumed through the fourth catalytic electrode 24 in an electrochemical reaction. As a result, an electric current flows through the electrical load circuit 18.

The present invention also includes a method for operating a fuel cell system 302. The method for operating the fuel cell system 302 includes the first step of providing an electrode-electrolyte assembly having a first catalytic electrode coupled to one side of the electrode-electrolyte assembly, and a second catalytic electrode coupled to a generally opposite side of the electrode-electrolyte assembly, a first conduit in fluid communication with the first catalytic electrode, a second conduit in fluid communication with the second catalytic electrode, a first electrical circuit 314 including an electrical energy storage device 316, and an electrical load circuit 318.

The method of operation of the fuel cell system 302 includes the step of flowing an aqueous solution of a fuel having a complex organic structure through the first conduit 310, preferably the fuel being at ambient temperature and flowing an oxidant through the second fluid conduit 312. The method of operation of the fuel cell system 302 includes the steps of establishing electrically conductive communication between a positive terminal of the energy storage device 316 and the first catalytic electrode and establishing electrically conductive communication between a negative terminal of the energy storage device 316 and the second catalytic electrode. Connecting the energy storage device in this manner provides the process energy for activating an ambient temperature electrochemical reaction to remove poisons from the first catalytic electrode and to form hydrogen fuel.

The method of operating the fuel cell 302 also includes the steps of charging the first catalytic electrode 310 with hydrogen. After a period of time, preferably for about 0.01 seconds to about 10 seconds, the first electrical potential is electrically disconnected from the fuel cell system 302. By subsequently connecting the electrical load circuit 318 having an electrical load in electrically conductive communication across the electrode-electrolyte assembly 304 an energy output is generated across the electrode-electrolyte assembly thereby consuming most of the hydrogen from the electrode-electrolyte assembly and the oxidant in an electrochemical reaction. As a result, an electric current flows through the electrical load circuit 318.

The method of operating the fuel cell system 302 includes interlocking the first electrical circuit 314 and the electrical load circuit 318 such that during operation the first electrical circuit is closed when the electrical load circuit is open; the electrical load circuit is closed when the first electrical circuit is open; and cyclically opening and closing the first electrical circuit and the electrical load circuit for predetermined periods of time. Preferably, the first electrical circuit is closed and the electrical load circuit is open for about 0.01 seconds to about 10 seconds and the electrical load circuit is cyclically closed and the first electrical circuit is open for about 0.5 minutes to about 10 minutes, in a recurring sequence of fuel processing and power generation cycles, respectively. The electrical load circuit 318 is cyclically opened and closed for a first predetermined period of time while the first electrical circuit 314 is cyclically toggled between fuel processing and storage recharge for a second predetermined period of time.

The present invention also includes a method for selecting a preferred fuel for a fuel cell system comprising the steps of selecting the fuel capable of being dissolved in water; and selecting an aqueous solution of the fuel, wherein the Gibbs free energy of the fuel is greater than the heat of reaction of the fuel.

Although the present invention has been disclosed and described with reference to certain embodiments thereof, it should be noted that other variations and modifications may be made, and it is intended that the following claims cover the variations and modifications within the true scope of the invention.

What is claimed is:

1. A fuel cell system comprising:
a first electrode-electrolyte assembly having a first catalytic electrode coupled to one side of said first electrode-electrolyte assembly, and a second catalytic electrode coupled to a generally opposite side of said first electrode-electrolyte assembly;
a first conduit in fluid communication with said first catalytic electrode for delivering fuel to said first catalytic electrode at ambient temperature;
a second electrode-electrolyte assembly having a third catalytic electrode coupled to one side of said second electrode-electrolyte assembly, and a fourth catalytic electrode coupled to a generally opposite side of said second electrode-electrolyte assembly;
an electrically conductive mesh having a plurality of apertures extending therethrough, said mesh being positioned between and in sealing engagement with said second catalytic electrode and said third catalytic electrode, such that portions of said second and third catalytic electrodes engage each other in said apertures;
a second conduit in fluid communication with said fourth catalytic electrode for delivering oxidant thereto;
means for providing an electrical potential across said first catalytic electrode, said first electrode-electrolyte assembly and said second catalytic electrode; and
an electrical load circuit for using an energy output generated across said third catalytic electrode, said second electrode-electrolyte assembly and said fourth catalytic electrode.

2. The fuel cell system of claim 1 wherein:
said means for providing the electrical potential has a positive terminal in electrically conductive communication with said first catalytic electrode and a negative terminal in electrically conductive communication with said second catalytic electrode for providing process energy sufficient to form hydrogen ions and removing poisons from said first catalytic electrode, thereby allowing the hydrogen ions to diffuse through said first electrode-electrolyte assembly to said third catalytic electrode.

3. The fuel cell system of claim 2 further comprising:
a third electrical circuit in electrical communication with said electrical load circuit and configured to divert a portion of current flow from the electrical load circuit to said third electrical circuit for providing the process energy; and
wherein the process energy is less than the energy output.

4. The fuel cell system of claim 3 further comprising:
an inductive device;
said inductive device being charged by the energy output to provide at least the process energy.

5. The fuel cell system of claim 2 wherein said first conduit is configured to deliver an aqueous solution of the fuel.

6. The fuel cell system of claim 5 wherein the fuel comprises a complex organic structure.

7. The fuel cell system of claim 1 wherein at least one mesh is embedded in at least one of said second catalytic electrode and said third catalytic electrode.

8. The fuel cell system of claim 1 wherein said second catalytic electrode and said third catalytic electrode comprise a common catalytic electrode, wherein said mesh is embedded in said common catalytic electrode.

9. The fuel cell system of claim 1 further including:
a plurality of said fuel cell systems each having one of said first conduit, said first electrode-electrolyte assembly, said mesh, said second electrode-electrolyte assembly and said second fluid conduit sequentially disposed one upon another;
a dielectric separator disposed between adjacent cells and on terminal ends of said plurality of said fuel cell systems;
means for providing an electrical potential across said first catalytic electrodes, said first electrode-electrolyte assembly and said second catalytic electrode of each of said fuel cell systems;
an electrical load circuit connected across said plurality of said fuel cell systems for using an energy output generated therefrom; and
wherein said plurality of said fuel cell systems are in electrically conductive communication with one another.

* * * * *